(12) United States Patent  
Tang et al.

(10) Patent No.: US 9,348,113 B2
(45) Date of Patent: May 24, 2016

(54) OPTICAL IMAGE CAPTURING SYSTEM

(71) Applicant: ABILITY OPTO-ELECTRONICS TECHNOLOGY CO.LTD., Taichung (TW)

(72) Inventors: Nai-Yuan Tang, Taichung (TW); Yeong-Ming Chang, Taichung (TW)

(73) Assignee: ABILITY OPTO-ELECTRONICS TECHNOLOGY CO.LTD., Taichung (TW)

( * ) Notice: Subject to any disclaimer, the term of this patent is extended or adjusted under 35 U.S.C. 154(b) by 42 days.

(21) Appl. No.: 14/540,424

(22) Filed: Nov. 13, 2014

(65) Prior Publication Data

US 2015/0378131 A1 Dec. 31, 2015

(30) Foreign Application Priority Data

Jun. 25, 2014 (TW) ............................. 103121996 A

(51) Int. Cl.
*G02B 9/64* (2006.01)
*G02B 13/00* (2006.01)
(52) U.S. Cl.
CPC .............. *G02B 13/0045* (2013.01); *G02B 9/64* (2013.01)
(58) Field of Classification Search
CPC ..... G02B 9/62; G02B 13/0045; H04N 5/2254
See application file for complete search history.

(56) References Cited

U.S. PATENT DOCUMENTS

2015/0338613 A1* 11/2015 Tang .................... G02B 9/62
359/713

FOREIGN PATENT DOCUMENTS

| CN | 102388331 A | 3/2012 |
| CN | 102436058 A | 5/2012 |
| TW | 201403166 A | 1/2014 |

* cited by examiner

*Primary Examiner* — David N Spector
(74) *Attorney, Agent, or Firm* — Muncy, Geissler, Olds & Lowe, P.C.

(57) ABSTRACT

The invention discloses a seven-piece optical lens for capturing image and a seven-piece optical system for capturing image. In order from an object side to an image side, the optical lens along the optical axis comprises a first lens with refractive power having a convex object-side surface; a second lens with refractive power, a third lens with refractive power; a fourth lens with refractive power; a fifth lens with refractive power, a sixth lens with refractive power, and a seventh lens with negative refractive power; and at least one of the image-side surface and object-side surface of each of the seven lens elements is aspheric. The optical lens can increase the aperture value and improve the imagining quality for use in compact cameras.

23 Claims, 18 Drawing Sheets

OPTICAL IMAGE CAPTURING SYSTEM

CROSS-REFERENCE TO RELATED APPLICATION

This application claims the benefit of Taiwan Patent Application No. 103121996, filed on Jun. 25, 2014, in the Taiwan Intellectual Property Office, the disclosure of which is incorporated herein in its entirety by reference.

BACKGROUND OF THE INVENTION

1. Field of the Invention

The present disclosure relates to an optical image capturing system, and more particularly to a compact optical image capturing system which can be applied to electronic products.

2. Description of the Related Art

In recent years, with the rise of portable electronic devices having camera functionalities, the demand for an optical image capturing system is raised gradually. The image sensing device of ordinary photographing camera is commonly selected from charge coupled device (CCD) or complementary metal-oxide semiconductor sensor (CMOS Sensor). In addition, as advanced semiconductor manufacturing technology enables the minimization of pixel size of the image sensing device, the development of the optical image capturing system towards the field of high pixels. Therefore, the requirement for high imaging quality is rapidly raised.

The traditional optical image capturing system of a portable electronic device comes with different designs, including a four-lens or a five-lens design. However, the requirement for the higher resolution and imaging quality and the requirement for a largest aperture of an end user, like functionalities of micro filming and night view, of the portable electronic device have been raised. The optical image capturing system in prior arts cannot meet the requirement of the higher order camera lens module.

Therefore, an optical imaging system capable of increasing an incoming light quantity of optical system as well as improving the image quality becomes an important issue.

SUMMARY OF THE INVENTION

The aspect of embodiment of the present disclosure directs to an optical image capturing system and an optical image capturing lens which use combination of refractive powers, convex and concave surfaces of seven-piece optical lenses (the convex or concave surface in the disclosure denotes the geometrical shape of an image-side surface or an object-side surface of each lens element on an optical axis) to further increase an incoming light quantity of the optical image capturing system effectively and to increase imaging quality so as to be applied to minimized electronic products.

The term and its definition to the lens element parameter in the embodiment of the present are shown as below for further reference.

The Lens Element Parameter Related to a Length or a Height in the Lens Element

A height for image formation of the optical image capturing system is denoted by HOI. A height of the optical image capturing system is denoted by HOS. On the optical axis, a distance from the object-side surface of the first lens element to the image-side surface of the seventh lens element is denoted by InTL, a distance from an aperture stop (aperture) to an image plane is denoted by InS, a distance from the first lens element to the second lens element is denoted by In12 (instance), and a central thickness of the first lens element of the optical image capturing system is denoted by TP1 (instance).

The Lens Element Parameter Related to a Material in the Lens Element

An Abbe number of the first lens element in the optical image capturing system is denoted by NA1 (instance). A refractive index of the first lens element is denoted by Nd1 (instance).

The Lens Element Parameter Related to a View Angle in the Lens Element

A view angle is denoted by AF. Half of the view angle is denoted by HAF. A major light angle is denoted by MRA.

The Lens Element Parameter Related to Exit/Entrance Pupil in the Lens Element

An entrance pupil diameter of the optical image capturing system is denoted by HEP.

The Lens Element Parameter Related to a Depth of the Lens Element Shape (Sinkage)

A distance in parallel with an optical axis from a maximum effective diameter position to an axial point on the object-side surface of the seventh lens element is denoted by InRS71 (instance). A distance in parallel with an optical axis from a maximum effective diameter position to an axial point on the image-side surface of the seventh lens element is denoted by InRS72 (instance). A distance in parallel with an optical axis from an inflection point to an axial point on the object-side surface of the seventh lens element is denoted by Inf71 (instance). A distance in parallel with an optical axis from an inflection point to an axial point on the image-side surface of the seventh lens element is denoted by Inf72 (instance).

The Lens Element Parameter Related to the Lens Element Shape

A critical point is a tangent point on a surface of a specific lens element, and the tangent point is tangent to a plane perpendicular to the optical axis and the tangent point cannot be a crossover point on the optical axis. To follow the past, a distance perpendicular to the optical axis between the critical point of the object-side surface of the seventh lens element to the optical axis is denoted by HVT71. A distance perpendicular to the optical axis between the critical point of the image-side surface of the seventh lens element to the optical axis is denoted by HVT72.

The Lens Element Parameter Related to an Aberration

Optical distortion for image formation in the optical image capturing system is denoted by ODT. TV distortion for image formation in the optical image capturing system is denoted by TDT. Further, the range of the aberration offset for the view of image formation may be limited to 50%~100% field. An offset of the spherical aberration is denoted by DFS. An offset of the coma aberration is denoted by DFC.

The disclosure provides an optical image capturing system, an object-side surface or an image-side surface of the seventh lens element has inflection points, such that the angle of incidence from each view field to the seventh lens element can be adjusted effectively and the optical distortion and the TV distortion can be corrected as well. Besides, the surface of the seventh lens element may have a better optical path adjusting ability to acquire better imaging quality.

The disclosure provides an optical image capturing system, in order from an object side to an image side, including a first lens element, a second lens element, a third lens element, a fourth lens element, a fifth lens element, a sixth lens element, and a seventh lens element. At least one of the first through sixth lens elements has a positive refractive power. The first lens element with a refractor power may have a convex object-side surface adjacent to the optical axis, and an image-side surface and the object-side surface of the first lens element are aspheric. The second lens element has a refractive power. The third lens element has a refractive power. The fourth lens element has a refractive power. The fifth lens element has a refractive power. The sixth lens element has a refractive power. The seventh lens element may have a negative refractor power and has a concave image-side surface adjacent to the optical axis, and the image-side surface and an object-side surface of the seventh lens element are aspheric. A focal length of the optical image capturing system is f, an entrance pupil diameter of the optical image capturing system is HEP, focal lengths of the first lens element and the seventh lens element are f1 and f7, respectively, and the following relation is satisfied: |f1|>f7, 0≤|f/f1|≤2, and 1.2≤f/HEP≤2.8.

The disclosure provides another optical image capturing system, in order from an object side to an image side, including a first lens element, a second lens element, a third lens element, a fourth lens element, a fifth lens element, a sixth lens element, and a seventh lens element. At least one of the first through sixth lens elements has a positive refractive power. The first lens element with a refractor power may have a convex object-side surface adjacent to the optical axis, and an image-side surface and the object-side surface of the first lens element are aspheric. The second lens element has a refractive power. The third lens element has a refractive power. The fourth lens element has a refractive power. The fifth lens element has a refractive power. The sixth lens element has a refractive power. The seventh lens element may have a negative refractor power and has a concave image-side surface adjacent to the optical axis, and the image-side surface and an object-side surface of the seventh lens element are aspheric. A focal length of the optical image capturing system is f, an entrance pupil diameter of the optical image capturing system is HEP, focal lengths of the first through seventh lens elements are f1, f2, f3, f4, f5, f6, and f7, respectively, optical distortion and TV distortion for image formation in the optical image capturing system are ODT and TDT, respectively, and the following relation is satisfied: |TDT|<1.5%, |ODT|× 2.5%, 0≤|f/f1|≤2, 1.2≤f/HEP≤2.8, |f1|>f7, and |f2|+|f3|+|f4|+|f5|+|f6|>|f1|+|f7|.

The disclosure provides another optical image capturing system, in order from an object side to an image side, including a first lens element, a second lens element, a third lens element, a fourth lens element, a fifth lens element, a sixth lens element, and a seventh lens element. At least one of the first through fifths lens elements has a positive refractive power. The first lens element with a refractor power may have a convex object-side surface adjacent to the optical axis, and an image-side surface and the object-side surface of the first lens element are aspheric. The second lens element has a refractive power. The third lens element has a refractive power. The fourth lens element has a refractive power. The fifth lens element has a refractive power. The sixth lens element has a refractive power. The seventh lens element may have a negative refractor power and has a concave image-side surface adjacent to the optical axis, and the image-side surface and an object-side surface of the seventh lens element are aspheric. A focal length of the optical image capturing system is f, focal lengths of the first through seventh lens elements are f1, f2, f3, f4, f5, f6, and f7, respectively, a distance in parallel with an optical axis from a maximum effective diameter position to an axial point on the image-side surface of the seventh lens element is InRS72. A central thickness of the seventh lens element on the optical axis is TP7. A distance from the object-side surface of the first lens element to the image-side surface of the seventh lens element is InTL. A distance from the object-side surface of the first lens element to the image plane is HOS. The following relation is satisfied: 0≤|f/f1|≤2, 1.2≤f/HEP≤2.8, |f1|>f7, 0≤InRS72/TP7<10, and 0.1<InTL/HOS<0.9.

The height of optical system (HOS) can be reduced to achieve the minimization of the optical image capturing system when an absolute value of f1 is larger than f7 (|f1|>f7).

When |f/f1| is satisfied with the above conditions, the arrangement of the refractive power of the first lens element can avoid generating the abnormal aberration that cannot be corrected.

When a sum of |f2|, |f3|, |f4|, |f5|, and |f6| and a sum of |f1| and |f7| are satisfied with the above conditions, at least one of the second through sixth lens elements can has a weak positive refractive power or a weak negative refractive power. The weak refractive power indicates an absolute value of the focal length of a specific lens element is greater than 10. When at least one of the second through sixth lens elements has the weak positive refractive power, the positive refractive power of the first lens element can be shared, such that the unnecessary aberration will not appear too early. On the contrary, when at least one of the second through sixth lens elements has the weak negative refractive power, the aberration of the optical image capturing system can be corrected and fine tuned.

When InRS72/TP7 is satisfied with the above conditions, it's favorable for manufacturing and forming the lens element and for maintaining the minimization for the optical image capturing system. Beside, the seventh lens element may have a negative refractive power and the concave image-side surface. Hereby, the back focal length is reduced for maintaining the miniaturization, so as to miniaturize the lens element effectively. In addition, at least one of the object-side and the image-side surfaces of the seventh lens elements may have at least one inflection point, such that the angle of incident with incoming light from an off-axis view field can be suppressed effectively and the aberration in the off-axis view field can be corrected further.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1A:
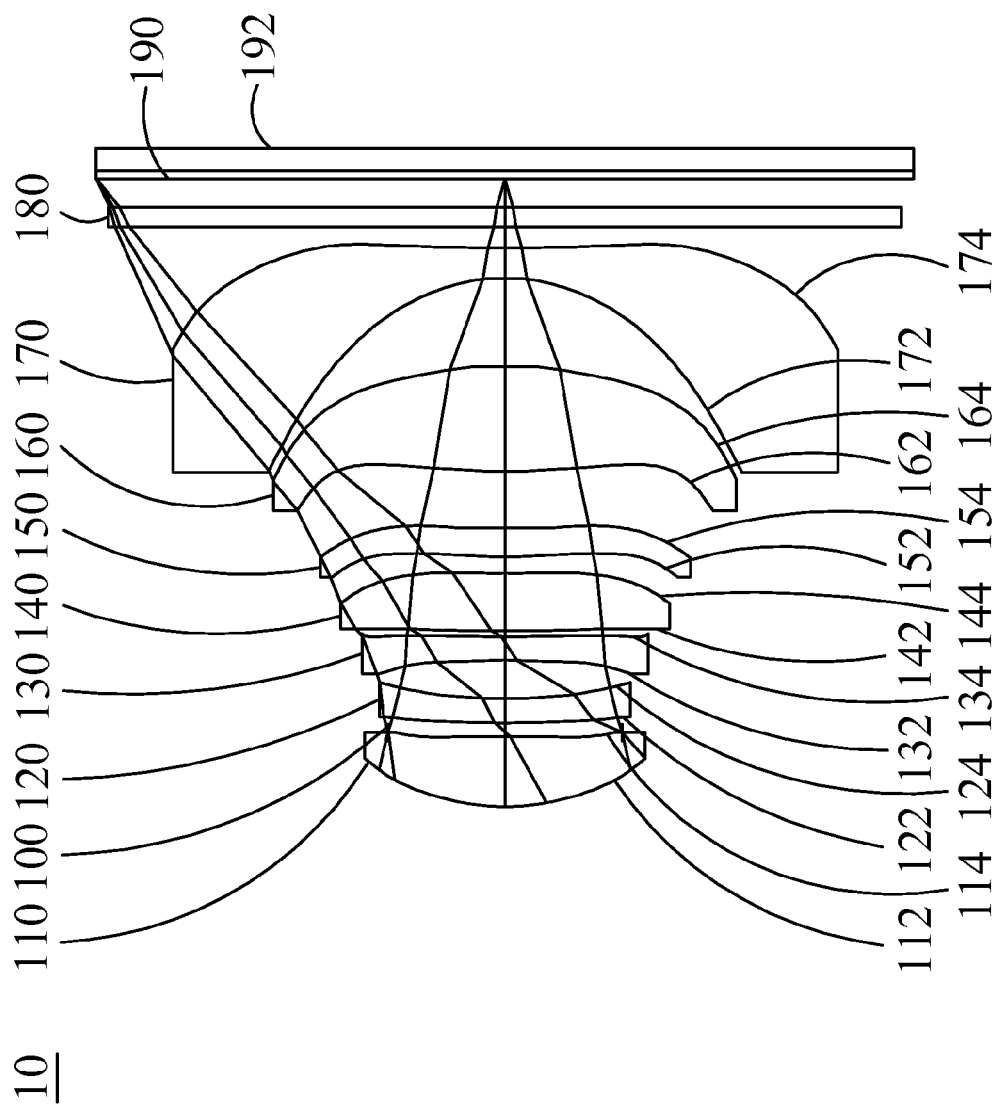
FIG. 1A is a schematic view of the optical image capturing system according to the first embodiment of the present application.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

An optical image capturing system, in order from an object side to an image side, includes a first lens element with a refractive power, a second lens element with a refractive power, a third lens element with a refractive power, a fourth lens element with a refractive power, a fifth lens element with a refractive power, a sixth lens element with a refractive power, and a seventh lens element with a refractive power. The optical image capturing system may further include an image sensing device which is disposed on an image plane.

A ratio of the focal length f of the optical image capturing system to a focal length fp of each of lens elements with the positive refractive power is PPR. A ratio of the focal length f of the optical image capturing system to a focal length fn of each of lens elements with a negative refractive power is NPR. A sum of the PPR of all lens elements with a positive refractive power is ΣPPR. A sum of the NPR of all lens elements with a negative refractive power is ΣNPR. It is beneficial to control the total refractive power and the total length of the optical image capturing system when following conditions are satisfied: $0.5 \leq \Sigma PPR/|\Sigma NPR| \leq 2$.

The first lens element may have a positive refractive power and a concave image-side surface and has a convex object-side surface. Thus, the strength of the positive refractive power of the first lens element can be fine-tuned to reduce the total length of the optical image capturing system.

The second lens element may have a negative refractive power, a convex object-side surface and a concave image-side surface. Hereby, the aberration generated by the first lens element can be corrected.

The third lens element may have a positive refractive power and a convex image-side surface. Hereby, the positive refractive power of the first lens element can be shared, so as to avoid the longitudinal spherical aberration to increase abnormally and to decrease the sensitivity of the optical image capturing system.

The fourth lens element may have a negative refractive power, a concave object-side surface and a convex image-side surface. Hereby, the astigmatic can be corrected, such that the image surface will become smoother.

The fifth lens element may have a positive refractive power and at least one of the object-side and the image-side surfaces of the fifth lens element may have at least one inflection point. Hereby, the spherical aberration can be improved by adjusting the angle of incidence from each view field to the fifth lens element effectively.

The sixth lens element may have a positive refractive power and at least one of the object-side and the image-side surfaces of the sixth lens element may have at least one inflection point. Hereby, the spherical aberration can be improved by adjusting the angle of incidence from each view field to the sixth lens element effectively.

The seventh lens element with a negative refractive power may have a concave image-side surface. Hereby, the back focal length is reduced for maintaining the miniaturization, so as to miniaturize the lens element effectively. In addition, at least one of the object-side and the image-side surfaces of the seventh lens elements may have at least one inflection point, such that the angle of incident with incoming light from an off-axis view field can be suppressed effectively and the aberration in the off-axis view field can be corrected further.

The optical image capturing system may further include an image sensing device which is disposed on an image plane. Half of a diagonal of an effective detection field of the image sensing device (imaging height or the maximum image height of the optical image capturing system) is HOI. A distance from the object side surface of the first lens element to the image plane on the optical axis is HOS. The following relation is satisfied: HOS/HOI≤7 and 0.5≤HOS/f≤2.5. Hereby, the miniaturization of the optical image capturing system can be maintained effectively, so as to be carried by lightweight portable electronic devices.

In addition, in the optical image capturing system of the disclosure, according to different requirements, at least one aperture stops may be arranged for reducing stray light and improving the image quality.

In the optical image capturing system of the disclosure, the aperture stop may be a front or middle aperture. The front aperture is the aperture stop between a photographed object and the first lens element. The middle aperture is the aperture stop between the first lens element and the image plane. If the aperture stop is the front aperture, a longer distance between the exit pupil and the image plane of the optical image capturing system can be formed, such that more optical elements can be disposed in the optical image capturing system and the effect of receiving images of the image sensing device can be raised. If the aperture stop is the middle aperture, the view angle of the optical image capturing system can be expended, such that the optical image capturing system has the same advantage that is owned by wide angle cameras. A distance from the aperture stop to the image-side surface of the sixth lens element is InS. The following relation is satisfied: 0.5≤InS/HOS≤1.1. Hereby, features of maintaining the minimization for the optical image capturing system and having wide-angle are available simultaneously.

In the optical image capturing system of the disclosure, a distance from the object-side surface of the first lens element to the image-side surface of the seventh lens element is InTL. A total central thickness of all lens elements with refractive powers on the optical axis is ΣTP. The following relation is satisfied: 0.1≤ΣTP/InTL≤0.9. Hereby, contrast ratio for the image formation in the optical image capturing system and defect-free rate for manufacturing the lens element can be given consideration simultaneously, and a proper back focal length is provided to dispose others optical components in the optical image capturing system.

A curvature radius of the object-side surface of the first lens element is R1. A curvature radius of the image-side surface of the first lens element is R2. The following relation is satisfied: 0.01<|R1/R2|<20. Hereby, the first lens element may have proper strength of the positive refractive power, to avoid the longitudinal spherical aberration to increase too fast. Preferably, the following relation is satisfied: 0.05<|R1/R2|<0.3.

A curvature radius of the object-side surface of the seventh lens element is R13. A curvature radius of the image-side surface of the seventh lens element is R14. The following relation is satisfied: −7<(R13−R14)/(R13+R14)<2. Hereby, the astigmatic generated by the optical image capturing system can be corrected beneficially.

A distance between the first lens element and the second lens element on the optical axis is IN12. The following relation is satisfied: IN12/f<0.2. Hereby, the aberration of the lens elements can be improved, such that the performance can be increased.

Central thicknesses of the first lens element and the second lens element on the optical axis are TP1 and TP2, respectively. The following relation is satisfied: 0.8≤(TP1+IN12)/TP2≤6.0. Hereby, the sensitivity produced by the optical image capturing system can be controlled, such that the performance can be increased.

Central thicknesses of the sixth lens element and the seventh lens element on the optical axis are TP6 and TP7, respectively, and a distance between the sixth lens element and the seventh lens element on the optical axis is IN67. The following relation is satisfied: 0.8≤(TP7+IN67)/TP6≤3. Hereby, the sensitivity produced by the optical image capturing system can be controlled and the total height of the optical image capturing system can be reduced.

Central thicknesses of the third lens element, the fourth lens element, and the fifth lens element on the optical axis are TP3, TP4, and TP5, respectively. A distance between the third lens element and the fourth lens element on the optical axis is IN34. A distance between the fourth lens element and the fifth lens element on the optical axis is IN45. A distance from the object-side surface of the first lens element to the image-side surface of the seventh lens element is InTL. The following relation is satisfied: 0.1≤(TP3+TP4+TP5)/ΣTP≤0.6. Hereby, the aberration generated by the process of moving the incident light can be adjusted slightly layer upon layer, and the total height of the optical image capturing system can be reduced.

A distance in parallel with an optical axis from a maximum effective diameter position to an axial point on the object-side surface of the sixth lens element is InRS61 (the InRS61 is positive if the distance is moved to the image-side surface, or the InRS61 is negative if the distance is moved to the object-side surface). A distance in parallel with an optical axis from a maximum effective diameter position to an axial point on the image-side surface of the sixth lens element is InRS62. A central thickness of the sixth lens element on the optical axis is TP6. The following relation is satisfied: 0<|InRS62|/TP6<5. Hereby, it's favorable for manufacturing and forming the lens element and for maintaining the minimization for the optical image capturing system.

A distance perpendicular to the optical axis between a critical point on the object-side surface of the sixth lens element and the optical axis is HVT61. A distance perpendicular to the optical axis between a critical point on the image-side surface of the sixth lens element and the optical axis is HVT62. The following relation is satisfied: 0≤HVT61/HVT62. Hereby, the aberration of the off-axis view field can be corrected effectively.

A distance in parallel with an optical axis from a maximum effective diameter position to an axial point on the object-side surface of the seventh lens element is InRS71. A distance in parallel with an optical axis from a maximum effective diameter position to an axial point on the image-side surface of the seventh lens element is InRS72. A central thickness of the seventh lens element on the optical axis is TP7. The following relation is satisfied: 0≤|InRS72|/TP7<10. Hereby, it's favorable for manufacturing and forming the lens element and for maintaining the minimization for the optical image capturing system.

A distance perpendicular to the optical axis between the critical point of the object-side surface of the seventh lens element to the optical axis is HVT71. A distance perpendicular to the optical axis between the critical point of the image-side surface of the seventh lens element to the optical axis is denoted by HVT72. The following relation is satisfied: 0≤HVT71/HVT72. Hereby, the aberration of the off-axis view field can be corrected effectively.

The following relation is satisfied for the optical image capturing system of the disclosure: 0≤HVT72/HOI≤9. Hereby, the aberration of surrounding view field for the optical image capturing system can be corrected beneficially.

The following relation is satisfied for the optical image capturing system of the present disclosure: 0≤HVT72/HOS≤0.5. Hereby, the aberration of surrounding for the optical image capturing system can be corrected beneficially.

A distance in parallel with an optical axis from an inflection point to an axial point on the object-side surface of the seventh lens element is denoted by Inf71. A distance in parallel with an optical axis from an inflection point to an axial point on the image-side surface of the seventh lens element is denoted by Inf72. The following relation is satisfied: 0≤Yc72/(Inf72+CT7)≤5.

The following relation is satisfied for the optical image capturing system of the present disclosure: 1≤|InRS62|+|InRS71|≤5. Hereby, a distance of a maximum effective diameter position between the sixth lens element and the seventh lens element can be controlled. Thus, it's favorable for correcting the aberration of surrounding view field for the optical image capturing system and for maintaining the minimization for the optical image capturing system.

The following relation is satisfied for the optical image capturing system of the disclosure: 0≤Inf72/|InRS72|≤2. A depth of the maximum effective diameter and positions of appearing inflection points on the image-side surface of the seventh lens element can be controlled. Thus, it's favorable for correcting the aberration of off-axis view field and maintaining the minimization for the optical image capturing system effectively.

In one embodiment of the optical image capturing system of the present disclosure, the chromatic aberration of the optical image capturing system can be corrected by staggering the lens element with high dispersion coefficient and the lens element with low dispersion coefficient.

The above Aspheric formula is: $z=ch^2/[1+[1-(k+1)c^2h^2]^{0.5}]+A4h^4+A6h^6+A8h^8+A10h^{10}+A12h^{12}+A14h^{14}+A16h^{16}+A18h^{18}+A20h^{20}+\ldots$ (1), where z is a position value of the position along the optical axis and at the height h which reference to the surface apex; k is the conic coefficient, c is the reciprocal of curvature radius, and A4, A6, A8, A10, A12, A14, A16, A18, and A20 are high order aspheric coefficients.

The optical image capturing system provided by the disclosure, the lens elements may be made of glass or plastic material. If plastic material is adopted to produce the lens elements, the cost of manufacturing will be lowered effectively. If lens elements are made of glass, the heat effect can be controlled and the designed space arranged for the refractive power of the optical image capturing system can be increased. Besides, the object-side surface and the image-side surface of the first through seventh lens elements may be aspheric, so as to obtain more control variables. Comparing with the usage of traditional lens element made by glass, the number of using lens elements can be reduced and the aberration can be eliminated. Therefore, the total height of the optical image capturing system can be reduced effectively.

In addition, in the optical image capturing system provided of the disclosure, the lens element has a convex surface if the surface of the lens element is convex adjacent to the optical axis. The lens element has a concave surface if the surface of the lens element is concaving adjacent to the optical axis.

The optical image capturing system of the disclosure can be adapted to the optical image capturing system with automatic focus if required. With the features of a good aberration correction and a high quality of image formation, the optical image capturing system can be used in various application fields.

According to the above embodiments, the specific embodiments with figures are presented in detailed as below.

The First Embodiment

Embodiment 1

Figure 1B:
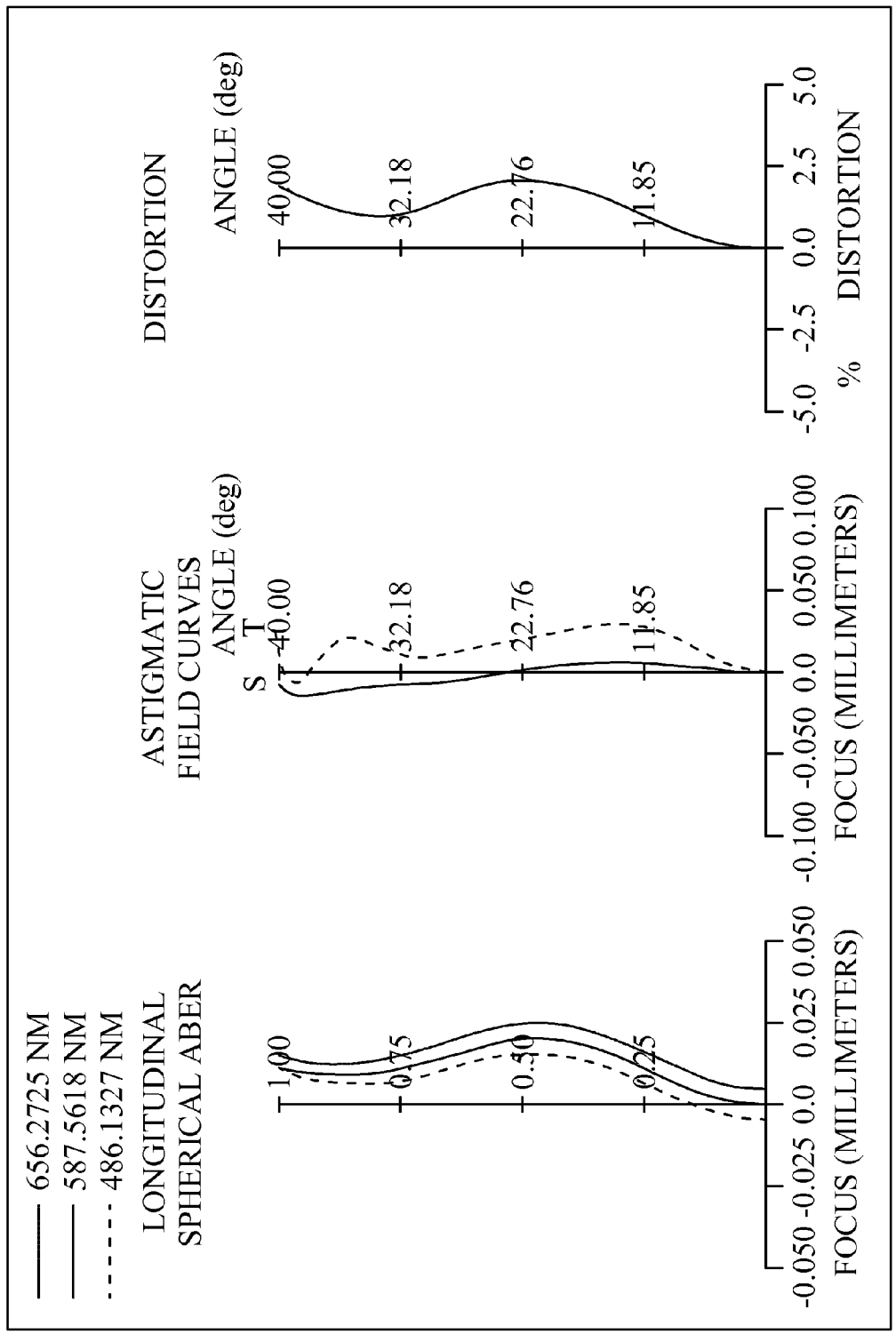
FIG. 1B is longitudinal spherical aberration curves, astigmatic field curves, and an optical distortion curve of the optical image capturing system in the order from left to right according to the first embodiment of the present application.
Figure 1C:
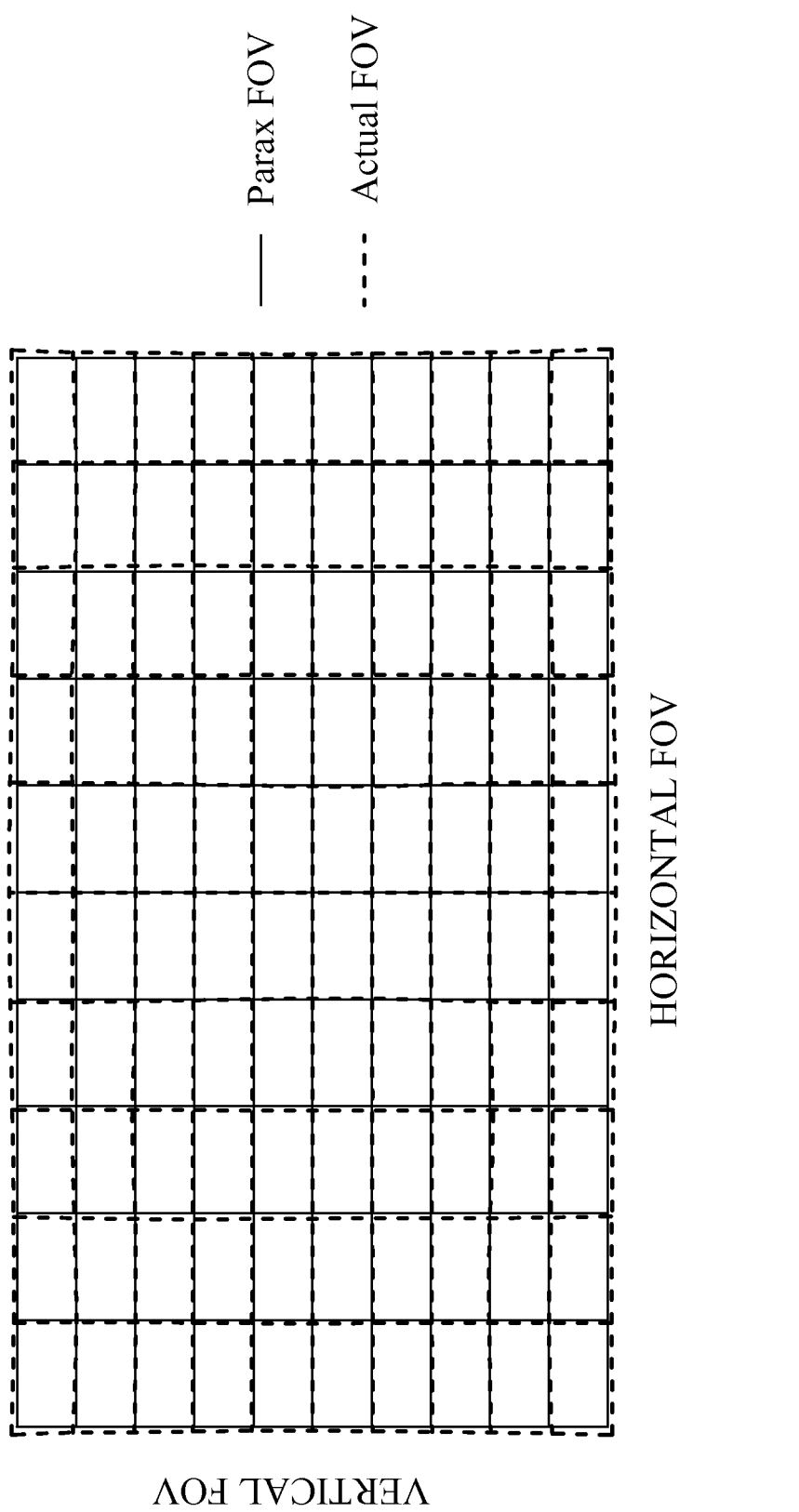
FIG. 1C is a TV distortion grid of the optical image capturing system according to the first embodiment of the present application.

Please refer to FIG. 1A, FIG. 1B, and FIG. 1C, FIG. 1A is a schematic view of the optical image capturing system according to the first embodiment of the present application, FIG. 1B is longitudinal spherical aberration curves, astigmatic field curves, and an optical distortion curve of the optical image capturing system in the order from left to right according to the first embodiment of the present application, and FIG. 1C is a TV distortion grid of the optical image capturing system according to the first embodiment of the present application. As shown in FIG. 1A, in order from an object side to an image side, the optical image capturing system includes a first lens element 110, an aperture stop 100, a second lens element 120, a third lens element 130, a fourth lens element 140, a fifth lens element 150, a sixth lens element 160, a seventh lens element 170, an IR-bandstop filter 180, an image plane 190, and an image sensing device 192.

The first lens element 110 has a positive refractive power and it is made of plastic material. The first lens element 110 has a convex object-side surface 112 and a concave image-side surface 114, and both of the object-side surface 112 and the image-side surface 114 are aspheric.

The second lens element 120 has a negative refractive power and it is made of plastic material. The second lens element 120 has a convex object-side surface 122 and a concave image-side surface 124, and both of the object-side surface 122 and the image-side surface 124 are aspheric.

The third lens element 130 has a negative refractive power and it is made of plastic material. The third lens element 130 has a concave object-side surface 132 and a convex image-side surface 134, and both of the object-side surface 132 and the image-side surface 134 are aspheric.

The fourth lens element 140 has a positive refractive power and it is made of plastic material. The fourth lens element 140 has a convex object-side surface 142 and a convex image-side surface 144, and both of the object-side surface 142 and the image-side surface 144 are aspheric.

The fifth lens element 150 has a positive refractive power and it is made of plastic material. The fifth lens element 150 has a convex object-side surface 152 and a concave image-side surface 154, and both of the object-side surface 152 and the image-side surface 154 are aspheric.

The sixth lens element 160 has a positive refractive power and it is made of plastic material. The sixth lens element 160 has a convex object-side surface 162 and a convex image-side surface 164. The object-side surface 162 of the sixth lens element 160 has at least one inflection point. Hereby, the spherical aberration can be improved by adjusting the angle of incidence from each view field to the sixth lens element effectively.

The seventh lens element 170 has a negative refractive power and it is made of plastic material. The seventh lens element 170 has a concave object-side surface 172 and a concave image-side surface 174. Hereby, the back focal length is reduced for maintaining the miniaturization, so as to miniaturize the lens element effectively. Besides, the image-side surface 174 of the seventh lens elements has at least one inflection point, such that the angle of incident with incoming light from an off-axis view field can be suppressed effectively and the aberration in the off-axis view field can be corrected further.

The IR-bandstop filter 180 is made of glass material without affecting the focal length of the optical image capturing system and it is disposed between the seventh lens element 170 and the image plane 190.

In the first embodiment of the optical image capturing system, a focal length of the optical image capturing system is f, an entrance pupil diameter of the optical image capturing system is HEP, and half of a maximal viewing angle of the optical image capturing system is HAF. The detailed parameters are shown as below: f=4.5707 mm, F/HEP=1.8, HAF=40 degree, and tan(HAF)=0.8390.

In the first embodiment of the optical image capturing system, a focal length of the first lens element 110 is f1 and a focal length of the seventh lens element 170 is f7. The following relation is satisfied: f1=4.4284 mm, |f/f1|=1.0321, f7=−2.8334, |f1|>f7, and |f1/f7|=1.5629.

In the first embodiment of the optical image capturing system, focal lengths of the second lens element 120, the third lens element 130, the fourth lens element 140, the fifth lens element 150, and the sixth lens element 160 are f2, f3, f4, f5, and f6, respectively. The following relation is satisfied: |f2|+|f3|+|f4|+|f5|+|f6|=90.6484, |f1|+|f7|=7.2618, and |f2|+|f3|+|f4|+|f5|+|f6|>|f1|+|f7|

A ratio of the focal length f of the optical image capturing system to a focal length fp of each of lens elements with the positive refractive power is PPR. A ratio of the focal length f of the optical image capturing system to a focal length fn of each of lens elements with a negative refractive power is NPR. In the first embodiment of the optical image capturing system, a sum of the PPR of all lens elements with the positive refractive power is ΣPPR=f/f1+f/f4+f/f5+f/f6=2.3936. A sum of the NPR of all lens elements with the negative refractive power is ΣNPR=f/f2+f/f3+f/f7=−2.2382. ΣPPR/|ΣNPR|=1.0695.

In the first embodiment of the optical image capturing system, a distance from the object-side surface 112 of the first lens element to the image-side surface 174 of the seventh lens element is InTL. A distance from the object side surface 112 of the first lens element to the image plane 190 is HOS. A distance from an aperture stop 100 to an image plane 190 is InS. Half of a diagonal of an effective detection field of the image sensing device 192 is HOI. A distance from the image-side surface 174 of the seventh lens element to the image plane 190 is BFL. The following relation is satisfied: InTL+BFL=HOS, HOS=6.0044 mm, HOI=3.8353 mm, HOS/HOI=5.2257, HOS/f=1.3137, InS=5.2899 mm, and InS/HOS=0.8810.

In the first embodiment of the optical image capturing system, a total central thickness of all lens elements with refractive powers on the optical axis is ΣTP. The following relation is satisfied: ΣTP=3.2467 mm and ΣTP/InTL=0.6088. Hereby, contrast ratio for the image formation in the optical image capturing system and defect-free rate for manufacturing the lens element can be given consideration simultaneously, and a proper back focal length is provided to arrange others components in the optical image capturing system.

In the first embodiment of the optical image capturing system, a curvature radius of the object-side surface 112 of the first lens element is R1. A curvature radius of the image-side surface 114 of the first lens element is R2. The following relation is satisfied: |R1/R2|=0.0861. Hereby, the first lens element may have proper strength of the positive refractive power, to avoid the longitudinal spherical aberration to increase too fast.

In the first embodiment of the optical image capturing system, a curvature radius of the object-side surface 172 of the seventh lens element is R13. A curvature radius of the image-side surface 174 of the seventh lens element is R14. The following relation is satisfied: (R13−R14)/(R13+R14)=−1.5469. Hereby, the astigmatic generated by the optical image capturing system can be corrected beneficially In the first embodiment of the optical image capturing system, focal lengths of the first lens element 110, the fourth lens element 140, the fifth lens element 150, and the sixth lens element 160 are f1, f4, f5, and f6, respectively. A sum of focal lengths of all lens elements with a positive refractive power is ΣPP. The following relation is satisfied: ΣPP=f1+f4+f5+f6=60.2624 mm and f1/(f1+f4+f5+f6)=0.0731. Hereby, it's favorable for allocating the positive refractive power of the first lens element 110 to others convex lens elements, and the significant aberrations generated in the process of moving the incident light can be suppressed.

In the first embodiment of the optical image capturing system, focal lengths of the second lens element, the third lens element, and the seventh lens element are f2, f3, and f7, respectively. A sum of focal lengths of all lens elements with a negative refractive power is ΣNP. The following relation is satisfied: ΣNP=f2+f3+f7=−36.8510 mm, and f7/(f2+f3+f7)=0.0765. Hereby, it's favorable for allocating the negative refractive power of the seventh lens element to others concave lens elements, and the significant aberrations generated in the process of moving the incident light can be suppressed.

In the first embodiment of the optical image capturing system, a distance between the first lens element 110 and the second lens element 120 on the optical axis is IN 12. The following relation is satisfied: IN12=0.1352 mm and IN12/f=0.0296. Hereby, the aberration of the lens elements can be improved, such that the performance can be increased.

In the first embodiment of the optical image capturing system, central thicknesses of the first lens element 110 and the second lens element 120 on the optical axis are TP1 and TP2, respectively. The following relation is satisfied: TP1=0.6689 mm, TP2=0.23 mm, and (TP1+IN12)/TP2=3.4961. Hereby, the sensitivity of the optical image capturing system can be controlled, such that the performance can be increased.

In the first embodiment of the optical image capturing system, central thicknesses of the sixth lens element 160 and the seventh lens element 170 on the optical axis are TP6 and TP7, respectively, and a distance between the sixth lens element and the seventh lens element on the optical axis is IN67. The following relation is satisfied: TP6=1.0055 mm, TP7=0.2814 mm, and (TP7+IN67)/TP6=1.1176. Hereby, the sensitivity of the optical image capturing system can be controlled and the total height of the optical image capturing system can be reduced.

In the first embodiment of the optical image capturing system, central thicknesses of the third lens element 130, the fourth lens element 140, and the fifth lens element 150 on the optical axis are TP3, TP4, and TP5, respectively. A distance between the third lens element 130 and the fourth lens element 140 on the optical axis is IN34. A distance between the fourth lens element 140 and the fifth lens element 150 on the optical axis is IN45. A distance from the object-side surface 112 of the first lens element to the image-side surface 174 of the seventh lens element is InTL. The following relation is satisfied: TP3=0.23 mm, TP4=0.5578 mm, TP5=0.2731 mm, and (TP3+TP4+TP5)/ΣTP=0.3268. Hereby, the aberration generated by the process of moving the incident light can be adjusted slightly layer upon layer, and the total height of the optical image capturing system can be reduced.

In the first embodiment of the optical image capturing system, a distance in parallel with an optical axis from a maximum effective diameter position to an axial point on the object-side surface 162 of the sixth lens element is InRS61. A distance in parallel with an optical axis from a maximum effective diameter position to an axial point on the image-side surface 164 of the sixth lens element is InRS62. A central thickness of the sixth lens element 160 on the optical axis is TP6. The following relation is satisfied: InRS61=−0.3725 mm, InRS62=−1.0961 mm, and |InRS62|/TP6=1.0901. Hereby, it's favorable for manufacturing and forming the lens element and for maintaining the minimization for the optical image capturing system.

In the first embodiment of the optical image capturing system, a distance perpendicular to the optical axis between a critical point on the object-side surface 162 of the sixth lens element and the optical axis is HVT61. A distance perpendicular to the optical axis between a critical point on the image-side surface 164 of the sixth lens element and the optical axis is HVT62. The following relation is satisfied: HVT61=1.2142 mm, HVT62=0 mm, and HVT61/HVT62=0.

In the first embodiment of the optical image capturing system, a distance in parallel with an optical axis from an inflection point to an axial point on the object-side surface 162 of the sixth lens element is denoted by Inf61. A distance in parallel with an optical axis from an inflection point to an axial point on the image-side surface 164 of the sixth lens element is Inf62. The following relation is satisfied: Inf1=0.0551 mm, Inf62=0 mm, and HVT62/(Inf62+CT6)=0.

In the first embodiment of the optical image capturing system, a distance in parallel with an optical axis from a maximum effective diameter position to an axial point on the object-side surface 172 of the seventh lens element is InRS71. A distance in parallel with an optical axis from a maximum effective diameter position to an axial point on the image-side surface 174 of the seventh lens element is InRS72. A central thickness of the seventh lens element 170 on the optical axis is TP7. The following relation is satisfied: InRS71=−1.851 mm, InRS72=−1.0045 mm, and |InRS72|/TP7=3.5697. Hereby, it's favorable for manufacturing and forming the lens element and for maintaining the minimization for the optical image capturing system.

In the first embodiment of the optical image capturing system, a distance perpendicular to the optical axis between the critical point of the object-side surface 172 of the seventh lens element to the optical axis is HVT71. A distance perpendicular to the optical axis between the critical point of the image-side surface 174 of the seventh lens element to the optical axis is HVT72. The following relation is satisfied: HVT71=0 mm, HVT72=1.2674 mm, and HVT71/HVT72=0. Hereby, the aberration of the off-axis view field can be corrected effectively.

In the first embodiment of the optical image capturing system, the following relation is satisfied: HVT72/HOI=0.3305. Hereby, the aberration of surrounding for the optical image capturing system can be corrected beneficially In the first embodiment of the optical image capturing system, the following relation is satisfied: HVT72/HOS=0.2111. Hereby, the aberration of surrounding for the optical image capturing system can be corrected beneficially In the first embodiment of the optical image capturing system, a distance in parallel with an optical axis from an inflection point to an axial point on the object-side surface 172 of the seventh lens element is denoted by Inf71. A distance in parallel with an optical axis from an inflection point to an axial point on the image-side surface 174 of the seventh lens element is denoted by Inf72. The following relation is satisfied: Inf71=0 mm, Inf72=0.0451 mm, and HVT72/(Inf72+CT7)=3.8818.

In the first embodiment of the optical image capturing system, the following relation is satisfied: |InRS62|+|InRS71|=2.9471 mm. Hereby, a distance of a maximum effective diameter position between the sixth lens element 160 and the seventh lens element 170 can be controlled. Thus, it's favorable for correcting the aberration of surrounding for the optical image capturing system and for maintaining the minimization for the optical image capturing system.

In the first embodiment of the optical image capturing system, the following relation is satisfied: Inf72/|InRS72|=0.0449. A depth of the maximum effective diameter and positions of appearing inflection points on the image-side 174 surface of the seventh lens element can be controlled. Thus, it's favorable for correcting the aberration of off-axis view field and maintaining the minimization for the optical image capturing system effectively.

In the first embodiment of the optical image capturing system, the second lens element, the third lens element, and the seventh lens element have negative refractive powers. An Abbe number of the second lens element is NA2. An Abbe number of the third lens element is NA3. An Abbe number of the seventh lens element is NA7. The following relation is satisfied: 1≤NA7/NA2. Hereby, the aberration for the optical image capturing system can be corrected beneficially.

In the first embodiment of the optical image capturing system, TV distortion for image formation in the optical image capturing system is TDT and optical distortion for image formation in the optical image capturing is ODT. The following relation is satisfied: |TDT|=0.94 and |ODT|=1.9599.

Please refer to the following Table 1 and Table 2.

The detailed data of the optical image capturing system of the first embodiment is as shown in Table 1. The detailed data of the optical image capturing system of the first embodiment is as shown in Table 1.

TABLE 1

Data of the optical image capturing system
f = 4.5707 mm, f/HEP = 1.8, HAF = 40 deg

| Surface # | | Curvature Radius | Thickness | Material | Index | Abbe # | Focal length |
|---|---|---|---|---|---|---|---|
| 0 | Object | Plano | Plano | | | | |
| 1 | Lens 1 | 2.29712 | 0.668946 | Plastic | 1.565 | 58 | 4.405 |
| 2 | | 26.68297 | 0.045368 | | | | |
| 3 | Ape. stop | Plano | 0.089845 | | | | |
| 4 | Lens 2 | 13.65238 | 0.23 | Plastic | 1.65 | 21.4 | −10.384 |
| 5 | | 4.48669 | 0.358683 | | | | |

TABLE 1-continued

Data of the optical image capturing system
f = 4.5707 mm, f/HEP = 1.8, HAF = 40 deg

| Surface # | | Curvature Radius | Thickness | Material | Index | Abbe # | Focal length |
|---|---|---|---|---|---|---|---|
| 6 | Lens 3 | −22.8014 | 0.23 | Plastic | 1.65 | 21.4 | −23.649 |
| 7 | | 47.36599 | 0.054835 | | | | |
| 8 | Lens 4 | 13.20186 | 0.557788 | Plastic | 1.565 | 58 | 20.384 |
| 9 | | −88.8646 | 0.15197 | | | | |
| 10 | Lens 5 | 5.93232 | 0.273144 | Plastic | 1.565 | 58 | 30.886 |
| 11 | | 8.83826 | 0.542787 | | | | |
| 12 | Lens 6 | 7.94491 | 1.005484 | Plastic | 1.565 | 58 | 4.587 |
| 13 | | −3.67115 | 0.842285 | | | | |
| 14 | Lens 7 | −1.83128 | 0.281438 | | 1.565 | 58 | −2.818 |
| 15 | | 8.52815 | 0.2 | | | | |
| 16 | IR-bandstop filter | Plano | 0.2 | | 1.517 | 64.2 | |
| 17 | | Plano | 0.252099 | | | | |
| 18 | Image plane | Plano | 0.015328 | | | | |

Reference wavelength (d-line) = 587.5 nm

As for the parameters of the aspheric surfaces of the first embodiment, reference is made to Table 2.

TABLE 2

Aspheric Coefficients

| Surface # | 1 | 2 | 4 | 5 | 6 | 7 |
|---|---|---|---|---|---|---|
| k = | 0.41223 | 23.12364 | 41.72578 | 7.17837 | 49.99854 | −50.00000 |
| A4 = | −2.71583E−03 | 1.12798E−02 | 2.61376E−03 | −1.30847E−02 | −2.29364E−02 | −1.22682E−02 |
| A6 = | 1.46922E−03 | −4.13663E−03 | −1.04751E−03 | −6.19251E−03 | −1.07500E−02 | −1.19599E−03 |
| A8 = | −1.16798E−03 | 2.64633E−03 | 1.64429E−03 | 3.31848E−03 | 1.74194E−03 | 2.58555E−03 |
| A10 = | 3.86338E−04 | −4.87913E−04 | 1.38781E−04 | −2.16169E−03 | −1.35269E−03 | 8.44094E−04 |
| A12 = | | | | | | |
| A14 = | | | | | | |

| Surface # | 8 | 9 | 10 | 11 | 12 | 13 |
|---|---|---|---|---|---|---|
| k = | −36.62296 | 50.00000 | −48.11219 | −49.99984 | −16.63997 | −2.21871 |
| A4 = | −1.46685E−02 | −3.04263E−02 | −2.44747E−02 | −3.74075E−02 | −6.98486E−03 | 1.46247E−02 |
| A6 = | 6.97097E−04 | −3.91762E−03 | −4.89633E−03 | 2.04344E−04 | −4.00620E−03 | −6.01684E−03 |
| A8 = | −7.00461E−05 | −8.89754E−04 | −9.29273E−04 | −3.75360E−04 | −3.83899E−04 | −3.42351E−04 |
| A10 = | 2.49597E−04 | −4.10632E−06 | −2.24070E−05 | −4.59214E−04 | −7.50806E−05 | 1.51881E−05 |
| A12 = | | | −3.81083E−04 | −7.68111E−05 | −5.94891E−06 | 1.57349E−06 |
| A14 = | | | 1.44730E−04 | 6.86388E−05 | −2.82154E−06 | 2.09638E−07 |

| Surface # | 14 | 15 |
|---|---|---|
| k = | −0.59182 | −38.73828 |
| A4 = | 3.52383E−03 | −1.36118E−02 |
| A6 = | −6.07710E−03 | −4.77797E−06 |
| A8 = | 4.66383E−04 | 2.50062E−05 |
| A10 = | 1.30961E−04 | 1.57226E−06 |
| A12 = | 9.98584E−06 | 4.62952E−08 |
| A14 = | −3.94438E−06 | −3.77857E−08 |

Table 1 is the detailed structure data to the first embodiment in FIG. 1A, the unit of the curvature radius, the thickness, the distance, and the focal length is millimeters (mm). Surfaces 0-16 illustrate the surfaces from the object side to the image plane in the optical image capturing system. Table 2 is the aspheric coefficients of the first embodiment, k is the conic coefficient in the aspheric surface formula, and A1-A14 are the first through fourteen order aspheric surface coefficients, respectively. Besides, the tables in following embodiments are referenced to the schematic view and the aberration graphs, respectively, and definitions of parameters in the tables are equal to those in the Table 1 and the Table 2, so the repetitious details need not be given here.

The Second Embodiment

Embodiment 2

Figure 2A:
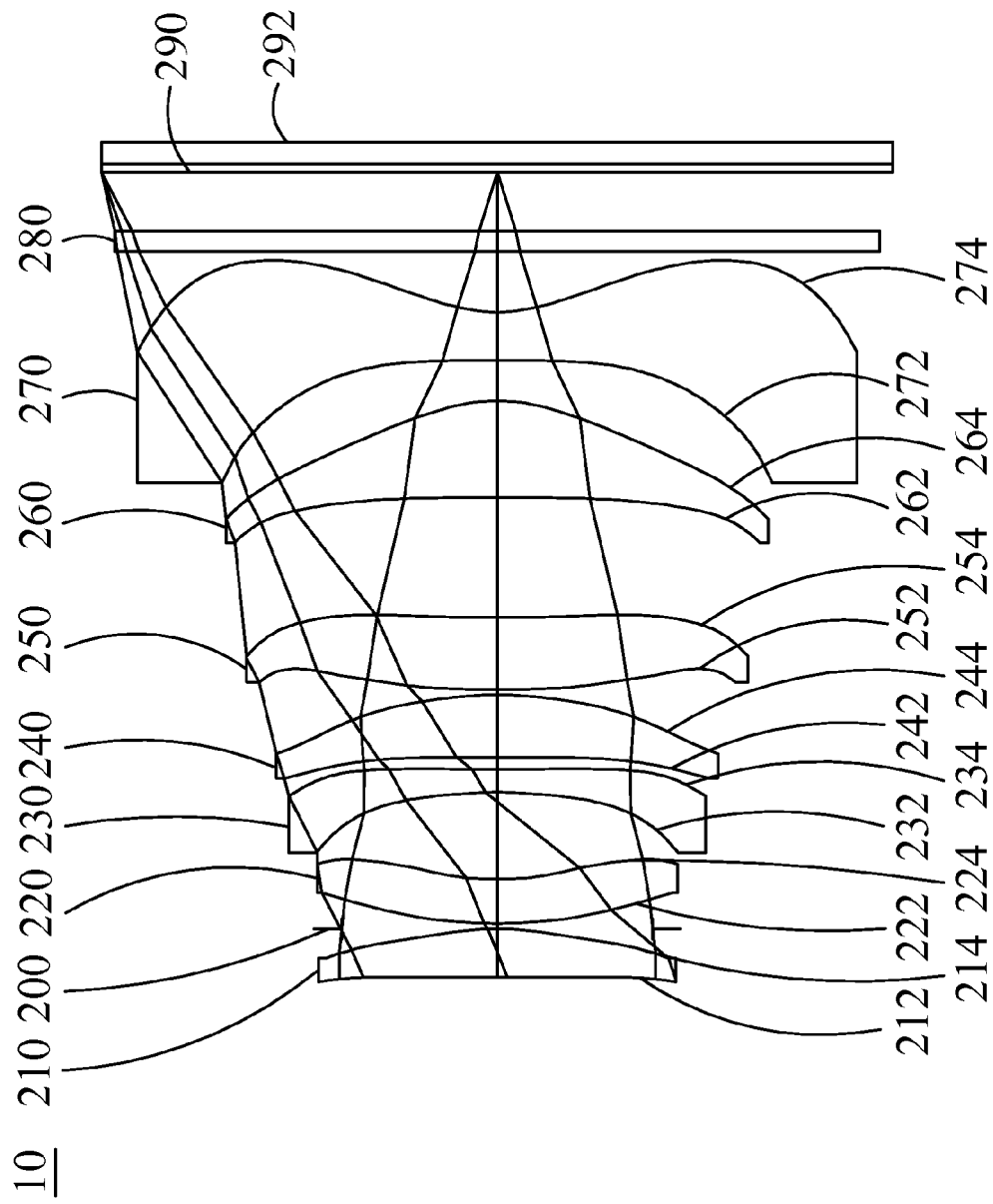
FIG. 2A is a schematic view of the optical image capturing system according to the second embodiment of the present application.
Figure 2B:
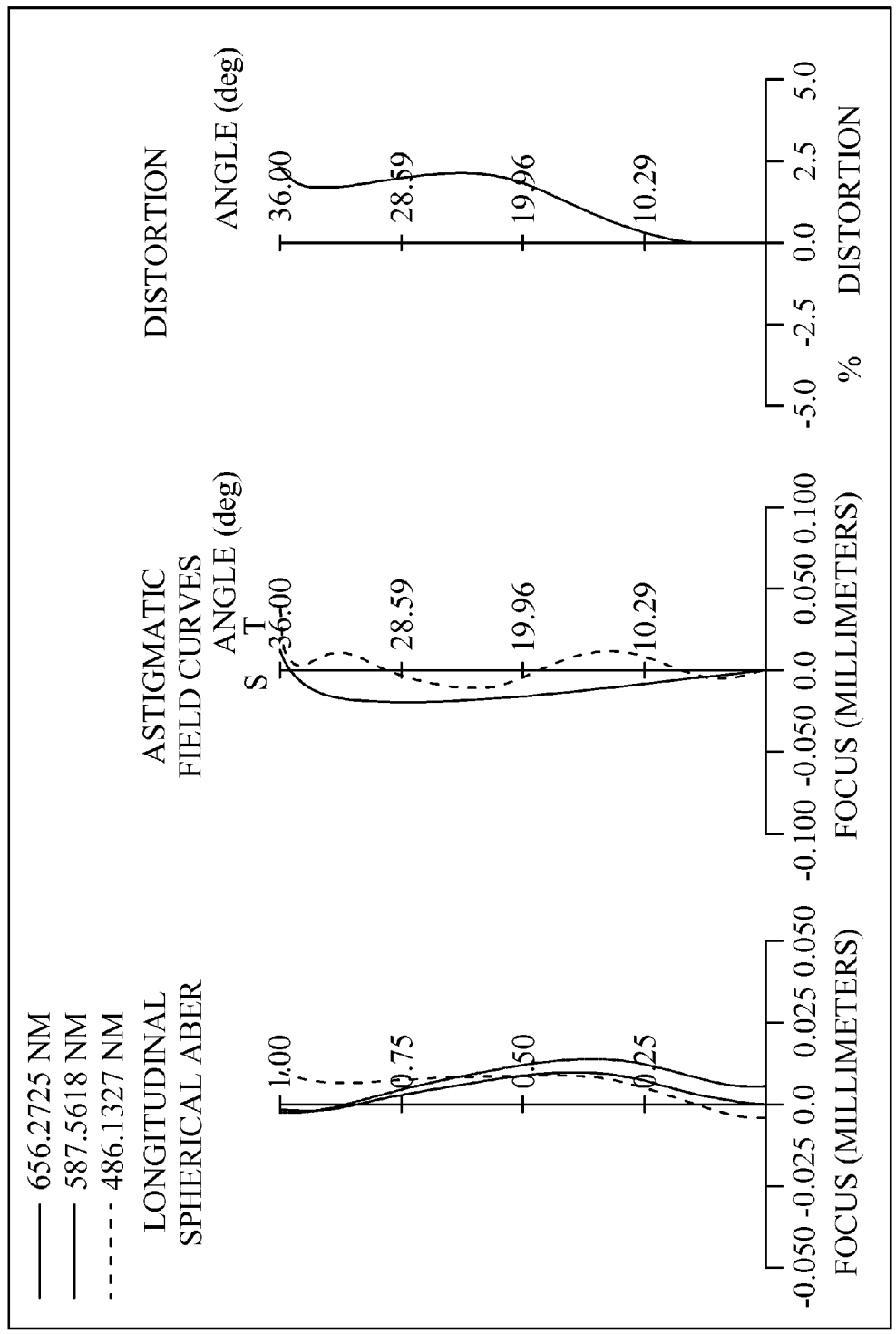
FIG. 2B is longitudinal spherical aberration curves, astigmatic field curves, and an optical distortion curve of the optical image capturing system in the order from left to right according to the second embodiment of the present application.
Figure 2C:
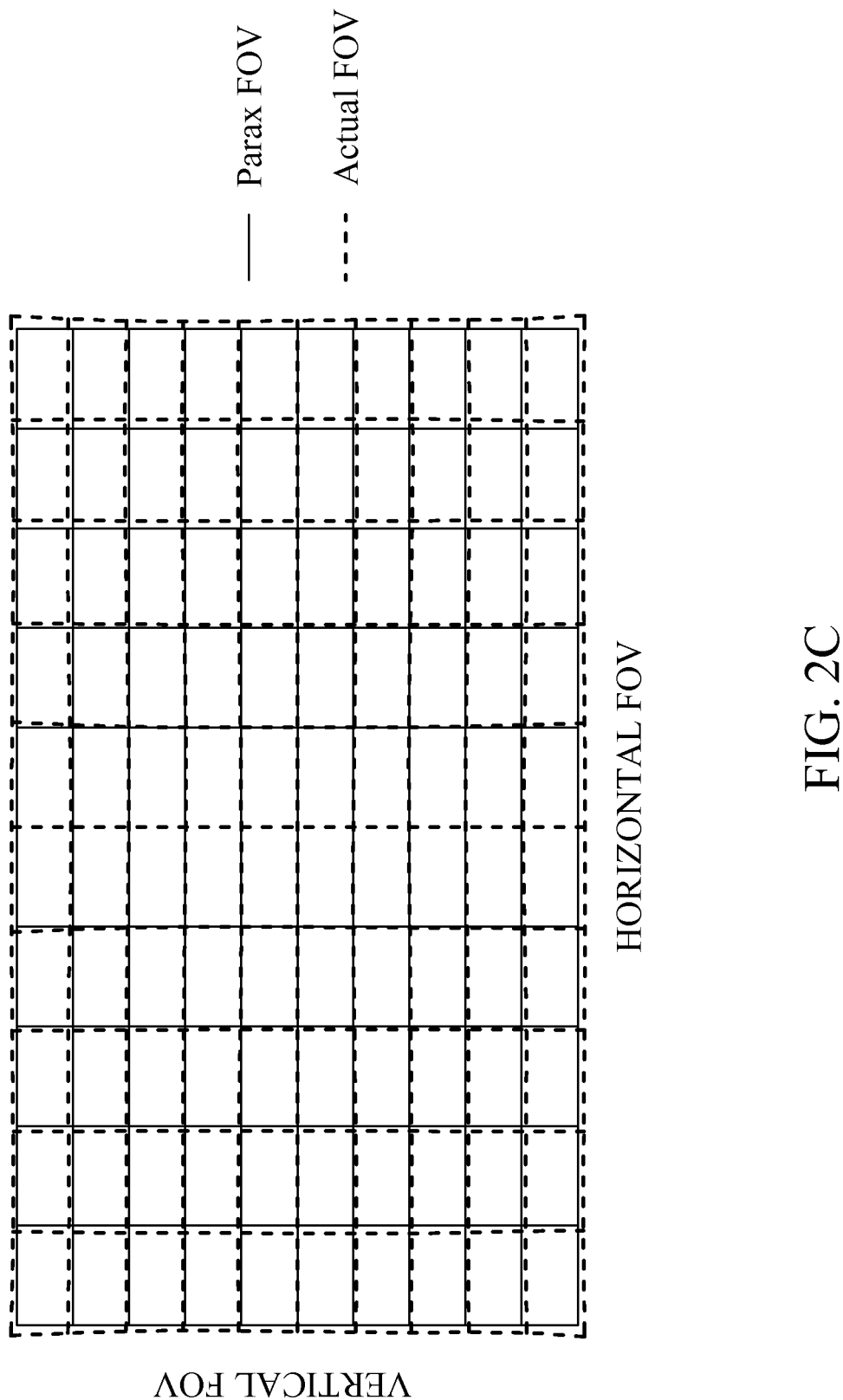
FIG. 2C is a TV distortion grid of the optical image capturing system according to the first embodiment of the present application.

Please refer to FIG. 2A, FIG. 2B, and FIG. 2C, FIG. 2A is a schematic view of the optical image capturing system according to the second embodiment of the present application, FIG. 2B is longitudinal spherical aberration curves, astigmatic field curves, and an optical distortion curve of the optical image capturing system in the order from left to right according to the second embodiment of the present application, and FIG. 2C is a TV distortion grid of the optical image capturing system according to the second embodiment of the present application. As shown in FIG. 2A, in order from an object side to an image side, the optical image capturing system includes an aperture stop 200, a first lens element 210, a second lens element 220, a third lens element 230, a fourth lens element 240, a fifth lens element 250, a sixth lens element 260, a seventh lens element 270, an IR-bandstop filter 280, an image plane 290, and an image sensing device 292.

The first lens element 210 has a positive refractive power and it is made of plastic material. The first lens element 210 has a convex object-side surface 212 and a convex image-side surface 214, and both of the object-side surface 212 and the image-side surface 214 are aspheric.

The second lens element 220 has a negative refractive power and it is made of plastic material. The second lens element 220 has a convex object-side surface 222 and a concave image-side surface 224, and both of the object-side surface 222 and the image-side surface 224 are aspheric.

The third lens element 230 has a negative refractive power and it is made of plastic material. The third lens element 230 has a concave object-side surface 232 and a concave image-side surface 234, and both of the object-side surface 232 and the image-side surface 234 are aspheric.

The fourth lens element 240 has a positive refractive power and it is made of plastic material. The fourth lens element 240 has a concave object-side surface 242 and a convex image-side surface 244, and both of the object-side surface 242 and the image-side surface 244 are aspheric.

The fifth lens element 250 has a positive refractive power and it is made of plastic material. The fifth lens element 250 has a convex object-side surface 252 and a concave image-side surface 254. Both of the object-side surface 252 and the image-side surface 254 are aspheric, and the image-side surface 254 has inflection points.

The sixth lens element 260 has a positive refractive power and it is made of plastic material. The sixth lens element 260 has a concave object-side surface 262 and a convex image-side surface 264, and the object-side surface 262 of the sixth lens element has at least one inflection point. Hereby, the spherical aberration can be improved by adjusting the angle of incidence from each view field to the sixth lens element 260 effectively.

The seventh lens element 270 has a negative refractive power and it is made of plastic material. The seventh lens element 270 has a convex object-side surface 272 and a concave image-side surface 274. Hereby, the back focal length is reduced for maintaining the miniaturization, so as to miniaturize the lens element effectively. Besides, the image-side surface 274 of the seventh lens elements has at least one inflection point, and the angle of incident with incoming light from an off-axis view field can be suppressed effectively and the aberration in the off-axis view field can be corrected further.

The IR-bandstop filter 280 is made of glass material without affecting the focal length of the optical image capturing system and it is disposed between the seventh lens element 270 and the image plane 290.

In the second embodiment of the optical image capturing system, focal lengths of the second lens element 220, the third lens element 230, the fourth lens element 240, the fifth lens element 250, and the sixth lens element 260 are f2, f3, f4, f5, and f6, respectively. The following relation is satisfied: |f2|+|f3|+|f4|+|f5|+|f6|=51.9801, |f1|+|f7|=8.6420, and |f2|+|f3|+|f4|+|f5|+|f6|>|f1|+|f7|.

In the second embodiment of the optical image capturing system, a central thickness of the sixth lens element 260 on the optical axis is TP6. A central thickness of the seventh lens element 270 on the optical axis is TP7. The following relation is satisfied: TP6=0.9525 mm and TP7=0.4852 mm.

In the second embodiment of the optical image capturing system, the first lens element 210, the fourth lens element 240, the fifth lens element 250, and the sixth lens element 260 are convex lens elements, and focal lengths of each of them are f1, f4, f5, and f6, respectively. A sum of focal lengths of all lens elements with a positive refractive power is ΣPP. The following relation is satisfied: ΣPP=f1+f4+f5+f6=35.8351 mm and f1/(f1+f4+f5+f6)=0.1647. Hereby, it's favorable for allocating the positive refractive power of the first lens element 210 to others convex lens elements, and the significant aberrations generated in the process of moving the incident light can be suppressed.

In the second embodiment of the optical image capturing system, focal lengths of the second lens element 220, the third lens element 230, and the seventh lens element 270 are f2, f3, and f7, respectively. A sum of focal lengths of all lens elements with a negative refractive power is ΣNP. The following relation is satisfied: ΣNP=f2+f3+f7=−24.7870 mm, and f7/(f2+f3+f7)=0.1106. Hereby, it's favorable for allocating the negative refractive power of the seventh lens element to others concave lens elements.

Please refer to the following Table 3 and Table 4.

The detailed data of the optical image capturing system of the second embodiment is as shown in Table 3.

TABLE 3

Data of the optical image capturing system
f = 5.2526 mm; f/HEP = 1.7; HAF = 36 deg

| Surface # | | Curvature Radius | Thickness | Material | Index | Abbe # | Focal length |
|---|---|---|---|---|---|---|---|
| 0 | Object | Plano | Plano | | | | |
| 1 | Lens 1 | 68.11996 | 0.483487 | Plastic | 1.565 | 58 | 4.405 |
| 2 | | −3.49625 | 0 | | | | |
| 3 | Ape. stop | Plano | 0.05 | | | | |
| 4 | Lens 2 | 4.03473 | 0.447528 | Plastic | 1.55 | 56.5 | −10.384 |
| 5 | | 2.57638 | 0.858457 | | | | |
| 6 | Lens 3 | −5.20633 | 0.23 | Plastic | 1.65 | 21.4 | −23.649 |
| 7 | | 78.27114 | 0.115778 | | | | |
| 8 | Lens 4 | −141.931 | 0.622323 | Plastic | 1.565 | 58 | 20.384 |
| 9 | | −4.21078 | 0.05 | | | | |
| 10 | Lens 5 | 7.56606 | 0.714199 | Plastic | 1.565 | 58 | 30.886 |
| 11 | | 25.07635 | 1.192391 | | | | |
| 12 | Lens 6 | −19.0648 | 0.952472 | Plastic | 1.565 | 58 | 4.587 |
| 13 | | −1.76128 | 0.403276 | | | | |

TABLE 3-continued

Data of the optical image capturing system
f = 5.2526 mm; f/HEP = 1.7; HAF = 36 deg

| Surface # | Curvature Radius | Thickness | Material | Index | Abbe # | Focal length |
|---|---|---|---|---|---|---|
| 14 | Lens 7 −137.931 | 0.48516 | Plastic | 1.53 | 55.8 | −2.818 |
| 15 | 1.47037 | 0.5 | | | | |
| 16 | IR-bandstop filter Plano | 0.2 | | 1.517 | 64.2 | |
| 17 | Plano | 0.690903 | | | | |
| 18 | Image plane Plano | 0.004026 | | | | |

Reference wavelength (d-line) = 587.5 nm

As for the parameters of the aspheric surfaces of the second embodiment, reference is made to Table 4.

TABLE 4

Aspheric Coefficients

| Surface # | 1 | 2 | 4 | 5 | 6 | 7 |
|---|---|---|---|---|---|---|
| k = | −50 | −21.586601 | −5.210483 | −12.5848 | 5.807337 | −50 |
| A4 = | −3.30061E−03 | −7.05919E−03 | −2.64853E−03 | −9.68664E−03 | −6.05571E−03 | −6.49213E−03 |
| A6 = | 2.10836E−04 | 1.78341E−03 | 1.43036E−03 | 2.50120E−03 | 1.10636E−03 | 1.48510E−03 |
| A8 = | −5.02110E−04 | −8.63373E−04 | −5.21815E−04 | −2.85206E−05 | −5.79228E−04 | −2.52288E−04 |
| A10 = | 1.12193E−04 | 1.53993E−04 | 9.36345E−05 | −5.99588E−05 | −2.52690E−05 | 2.05622E−05 |
| A12 = | | | | | | |
| A14 = | | | | | | |

| Surface # | 8 | 9 | 10 | 11 | 12 | 13 |
|---|---|---|---|---|---|---|
| k = | 50 | 0.292426 | −0.518495 | 42.211497 | 50 | −5.176421 |
| A4 = | −1.19614E−02 | −1.79560E−03 | −1.75404E−03 | −7.72726E−03 | 2.46323E−03 | −3.36582E−03 |
| A6 = | 4.37485E−05 | 2.67143E−04 | 2.32594E−05 | 1.79035E−04 | 1.22405E−04 | 6.30874E−04 |
| A8 = | −1.54836E−04 | 2.47676E−05 | −9.54522E−05 | −1.39442E−05 | −9.38681E−05 | −5.96198E−05 |
| A10 = | 6.55356E−05 | 3.74307E−05 | −1.20664E−05 | −5.48540E−06 | −1.20263E−05 | −8.31172E−06 |
| A12 = | | | 2.94692E−06 | −1.64479E−06 | −3.82680E−07 | −1.67895E−07 |
| A14 = | | | 9.92798E−07 | 1.15804E−07 | 2.53737E−07 | 7.24677E−08 |

| Surface # | 14 | 15 |
|---|---|---|
| k = | −50 | −5.363923 |
| A4 = | −2.20116E−02 | −1.45174E−02 |
| A6 = | 1.02246E−03 | 9.01618E−04 |
| A8 = | 2.85159E−04 | −4.47595E−05 |
| A10 = | 9.23914E−06 | −6.73215E−07 |
| A12 = | −1.48358E−06 | 3.21116E−08 |
| A14 = | 3.09070E−07 | 1.29223E−09 |

In the second embodiment, the presentation of the aspheric surface formula is similar to that in the first embodiment. Besides, the definitions of parameters in following tables are equal to those in the first embodiment, so the repetitious details need not be given here.

The following content may be deduced from Table 3 and Table 4.

| Second embodiment | | | |
|---|---|---|---|
| |f/f1| | 0.8902 | InRS61 | −0.4474 |
| f1/ΣPP | 0.1647 | InRS62 | −1.1701 |
| f7/ΣNP | 0.1106 | Inf62 | 0 |
| IN12/f | 0.0095 | HVT62 | 0 |
| HOS/f | 1.5231 | InRS71 | −1.2159 |
| ΣPPR | 3.4129 | InRS72 | −0.4105 |
| |ΣNPR| | 2.9771 | Inf72 | 0.5053 |
| ΣPPR/|ΣNPR| | 1.1464 | HVT72 | 2.2406 |
| (R13 − R14)/(R13 + R14) | 1.0216 | |InRS62|/TP6 | 1.2285 |
| HOS | 8 | |InRS62| + |InRS71| | 2.3860 |
| HOS/HOI | 5.5470 | |InRS72|/TP7 | 0.8460 |
| InS/HOS | 0.9396 | Inf72/|InRS72| | 1.2309 |
| InTL/HOS | 0.8256 | HVT72/HOI | 0.5871 |
| ΣTP/InTL | 0.5958 | HVT72/HOS | 0.2801 |
| (TP1 + IN12)/TP2 | 1.1922 | HVT72/(Inf72 + CT7) | 2.2621 |
| (TP7 + IN67)/TP6 | 0.9328 | |TDT| | 0.78 |
| (TP3 + TP4 + TP5)/ΣTP | 0.3981 | |ODT| | 2.4622 |

The Third Embodiment

Embodiment 3

Figure 3A:
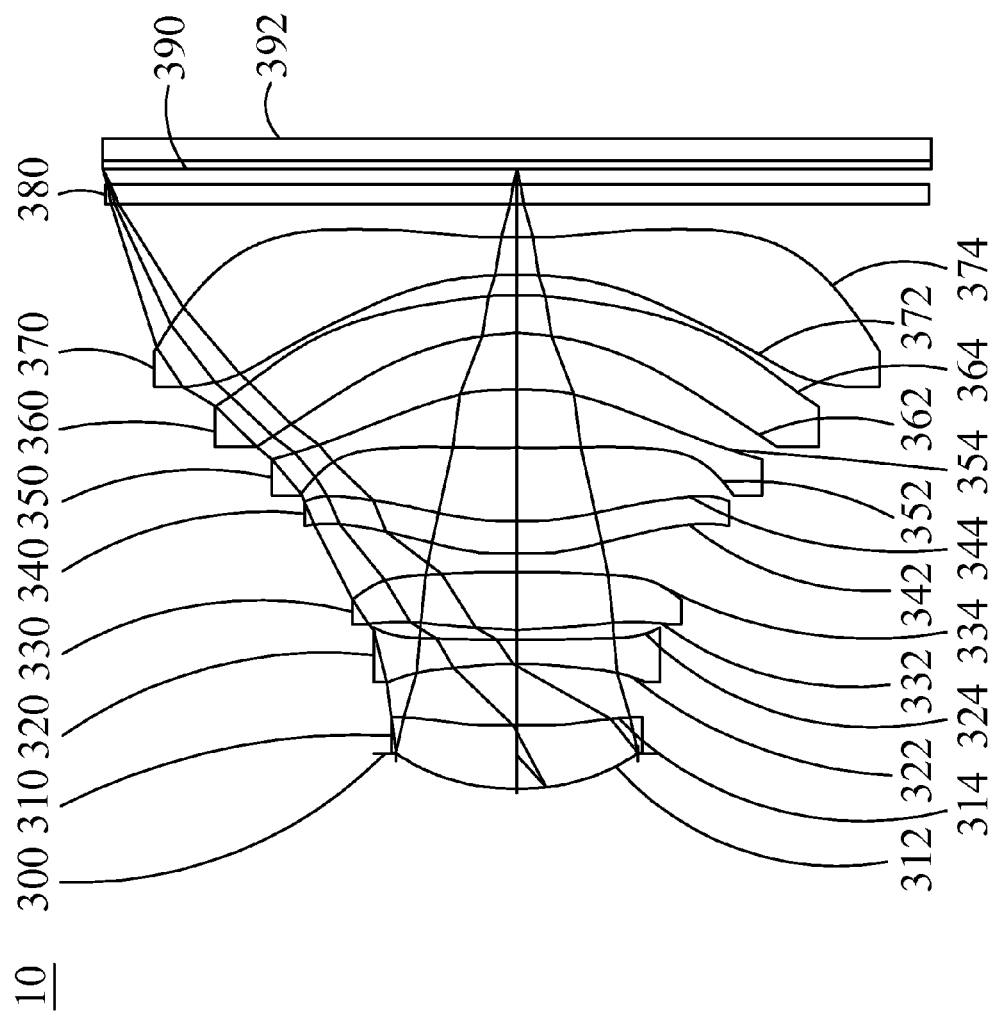
FIG. 3A is a schematic view of the optical image capturing system according to the third embodiment of the present application.
Figure 3B:
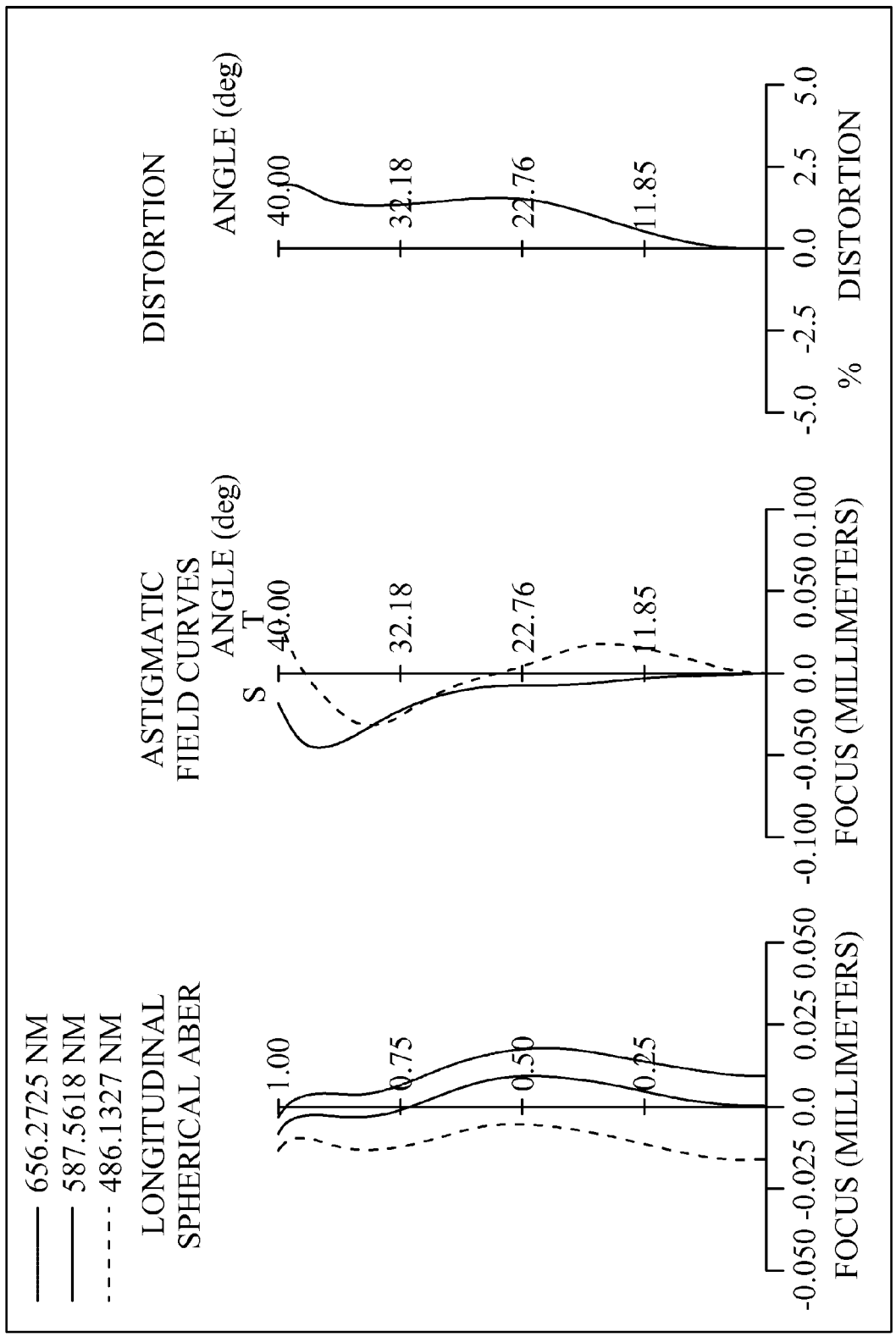
FIG. 3B is longitudinal spherical aberration curves, astigmatic field curves, and an optical distortion curve of the optical image capturing system in the order from left to right according to the third embodiment of the present application.
Figure 3C:
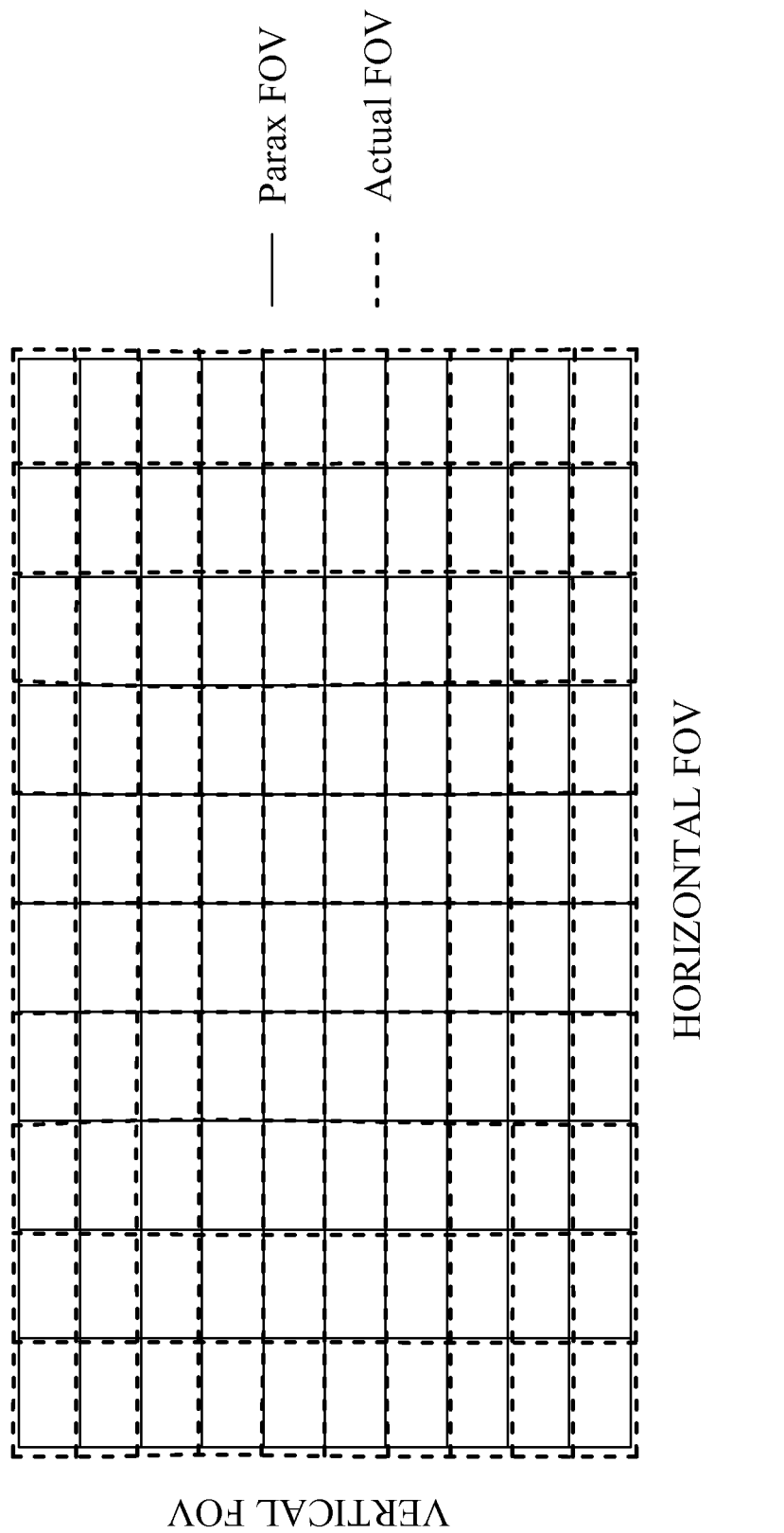
FIG. 3C is a TV distortion grid of the optical image capturing system according to the third embodiment of the present application.

Please refer to FIG. 3A, FIG. 3B, and FIG. 3C, FIG. 3A is a schematic view of the optical image capturing system according to the third embodiment of the present application, FIG. 3B is longitudinal spherical aberration curves, astigmatic field curves, and an optical distortion curve of the optical image capturing system in the order from left to right according to the third embodiment of the present application, and FIG. 3C is a TV distortion grid of the optical image capturing system according to the third embodiment of the present application. As shown in FIG. 3A, in order from an object side to an image side, the optical image capturing system includes an aperture stop 300, a first lens element 310, a second lens element 320, a third lens element 330, a fourth lens element 340, a fifth lens element 350, a sixth lens element 360, a seventh lens element 370, an IR-bandstop filter 380, an image plane 390, and an image sensing device 392.

The first lens element 310 has a positive refractive power and it is made of plastic material. The first lens element 310 has a convex object-side surface 312 and a concave image-side surface 314, and both of the object-side surface 312 and the image-side surface 314 are aspheric.

The second lens element 320 has a negative refractive power and it is made of plastic material. The second lens element 320 has a concave object-side surface 322 and a concave image-side surface 324, and both of the object-side surface 322 and the image-side surface 324 are aspheric.

The third lens element 330 has a positive refractive power and it is made of plastic material. The third lens element 330 has a convex object-side surface 332 and a convex image-side surface 334, and both of the object-side surface 332 and the image-side surface 334 are aspheric.

The fourth lens element 340 has a positive refractive power and it is made of plastic material. The fourth lens element 340 has a convex object-side surface 342 and a concave image-side surface 344, and both of the object-side surface 342 and the image-side surface 344 are aspheric.

The fifth lens element 350 has a positive refractive power and it is made of plastic material. The fifth lens element 350 has a convex object-side surface 352 and a convex image-side surface 354. Both of the object-side surface 352 and the image-side surface 354 are aspheric, and the object-side surface 352 has inflection points.

The sixth lens element 360 has a negative refractive power and it is made of plastic material. The sixth lens element 360 has a concave object-side surface 362 and a convex image-side surface 364, and the object-side surface 362 of the sixth lens element has at least one inflection point. Hereby, the spherical aberration can be improved by adjusting the angle of incidence from each view field to the sixth lens element 360 effectively.

The seventh lens element 370 has a negative refractive power and it is made of plastic material. The seventh lens element 370 has a concave object-side surface 372 and a concave image-side surface 374. Hereby, the back focal length is reduced for maintaining the miniaturization, so as to miniaturize the lens element effectively. Besides, the image-side surface 374 of the seventh lens elements has at least one inflection point, and the angle of incident with incoming light from an off-axis view field can be suppressed effectively and the aberration in the off-axis view field can be corrected further.

The IR-bandstop filter 380 is made of glass material without affecting the focal length of the optical image capturing system and it is disposed between the seventh lens element 370 and the image plane 390.

In the third embodiment of the optical image capturing system, focal lengths of the second lens element 320, the third lens element 330, the fourth lens element 340, the fifth lens element 350, and the sixth lens element 350 are f2, f3, f4, f5, and f6, respectively. The following relation is satisfied: $|f2|+|f3|+|f4|+|f5|+|f6|=53.9016$, $|f1|+|f7|=9.0440$, and $|f2|+|f3|+|f4|+|f5|+|f6|>|f1|+|f7|$.

In the third embodiment of the optical image capturing system, a central thickness of the sixth lens element 360 on the optical axis is TP6. A central thickness of the seventh lens element 370 on the optical axis is TP7. The following relation is satisfied: TP6=0.3549 mm and TP7=0.3521 mm.

In the third embodiment of the optical image capturing system, focal lengths of the first lens element 310, the third lens element 330, the fourth lens element 340, and the fifth lens element 350 are f1, f3, f4, and f5, respectively. A sum of focal lengths of all lens elements with a positive refractive power is τPP. The following relation is satisfied: $\Sigma PP=f1+f3+f4+f5=44.4613$ mm and $f1/(f1+f3+f4+f5)=0.1136$ mm. Hereby, it's favorable for allocating the positive refractive power of the first lens element 310 to others convex lens elements, and the significant aberrations generated in the process of moving the incident light can be suppressed.

In the third embodiment of the optical image capturing system, focal lengths of the second lens element 320, the sixth lens element 360, and the seventh lens element 370 are f2, f6, and f7, respectively. A sum of focal lengths of all lens elements with a negative refractive power is ΣNP. The following relation is satisfied: $\Sigma NP=f2+f6+f7=-18.4843$ mm and $f7/(f2+f6+f7)=0.2160$. Hereby, it's favorable for allocating the negative refractive power of the seventh lens element to others concave lens elements.

Please refer to the following Table 5 and Table 6.

The detailed data of the optical image capturing system of the third embodiment is as shown in Table 5.

TABLE 5

Data of the optical image capturing system
f = 4.5724 mm; f/HEP = 2.0; HAF = 40 deg

| Surface # | | Curvature Radius | Thickness | Material | Index | Abbe # | Focal length |
|---|---|---|---|---|---|---|---|
| 0 | Object | Plano | Plano | | | | |
| 1 | Ape. stop | Plano | −0.33354 | | | | |
| 2 | Lens 1 | 2.15728 | 0.600257 | Plastic | 1.565 | 58 | 5.051 |
| 3 | | 7.95102 | 0.580328 | | | | |
| 4 | Lens 2 | −4.57617 | 0.23 | Plastic | 1.64 | 23.3 | −6.067 |
| 5 | | 26.12977 | 0.096215 | | | | |
| 6 | Lens 3 | 6.53034 | 0.536917 | Plastic | 1.565 | 58 | 9.11 |
| 7 | | −23.5826 | 0.170061 | | | | |
| 8 | Lens 4 | 2.58441 | 0.302053 | Plastic | 1.65 | 21.4 | 26.419 |
| 9 | | 2.9022 | 0.695806 | | | | |
| 10 | Lens 5 | 17.31457 | 0.552455 | Plastic | 1.584 | 40.5 | 3.881 |
| 11 | | −2.57945 | 0.526363 | | | | |
| 12 | Lens 6 | −2.38582 | 0.354906 | Plastic | 1.65 | 21.4 | −8.424 |

TABLE 5-continued

Data of the optical image capturing system
f = 4.5724 mm; f/HEP = 2.0; HAF = 40 deg

| Surface # | Curvature Radius | Thickness | Material | Index | Abbe # | Focal length |
|---|---|---|---|---|---|---|
| 13 | | −4.47565 | 0.200051 | | | |
| 14 | Lens 7 | −3.19504 | 0.352119 | Plastic | 1.565 | 58 | −3.993 |
| 15 | | 7.98292 | 0.3 | | | |
| 16 | IR-bandstop filter | Plano | 0.2 | | 1.517 | 64.2 |
| 17 | | Plano | 0.135729 | | | |
| 18 | Image plane | Plano | 0.000283 | | | |

Reference wavelength (d-line) = 587.5 nm

As for the parameters of the aspheric surfaces of the third embodiment, reference is made to Table 6.

TABLE 6

Aspheric Coefficients

| Surface # | 2 | 3 | 4 | 5 | 6 | 7 |
|---|---|---|---|---|---|---|
| k = | −0.04929 | 18.763452 | −3.146052 | 50 | 11.511117 | −50 |
| A4 = | 3.99752E−03 | −2.65753E−03 | −5.38259E−04 | 4.26480E−04 | −1.12976E−02 | −5.06681E−03 |
| A6 = | −3.43914E−05 | −5.82241E−03 | −3.27978E−03 | 7.15484E−03 | −1.05403E−02 | −8.71238E−03 |
| A8 = | 3.06709E−03 | 3.81493E−03 | 2.08987E−03 | −1.24014E−03 | −1.67228E−03 | −1.30073E−03 |
| A10 = | −1.92345E−03 | −3.58015E−03 | −1.95683E−03 | 1.58148E−03 | 5.97801E−04 | −1.51067E−04 |
| A12 = | | | | | | |
| A14 = | | | | | | |

| Surface # | 8 | 9 | 10 | 11 | 12 | 13 |
|---|---|---|---|---|---|---|
| k = | −8.387968 | −10.084497 | −21.814536 | −1.977364 | −0.189956 | −0.012338 |
| A4 = | −4.77471E−03 | −9.45197E−03 | −1.89927E−02 | 2.12693E−03 | 1.37038E−02 | 3.06638E−03 |
| A6 = | −1.13776E−03 | −2.52390E−04 | 1.40796E−03 | 8.09418E−04 | −1.01340E−03 | −5.02083E−04 |
| A8 = | −3.79868E−05 | −6.25262E−05 | −6.62896E−04 | 1.73159E−04 | 8.89894E−05 | −4.41194E−05 |
| A10 = | −5.94383E−05 | −3.28088E−05 | −5.77386E−05 | 6.40561E−06 | 4.68212E−05 | −9.48040E−07 |
| A12 = | | | −4.45309E−06 | −1.80035E−06 | 4.24385E−06 | 3.32117E−07 |
| A14 = | | | −2.11574E−06 | −6.35294E−07 | −6.87562E−07 | 7.72687E−08 |

| Surface # | 14 | 15 |
|---|---|---|
| k = | −0.236608 | −49.681093 |
| A4 = | 2.49475E−03 | −4.17639E−03 |
| A6 = | 4.46483E−04 | −8.87102E−04 |
| A8 = | 2.61112E−05 | 3.25266E−05 |
| A10 = | 1.39210E−06 | −4.51219E−08 |
| A12 = | 2.96859E−08 | −2.85078E−08 |
| A14 = | −9.92819E−09 | 6.51010E−10 |

The presentation of the aspheric surface formula in the third embodiment is similar to that in the first embodiment. Besides, the definitions of parameters in following tables are equal to those in the first embodiment so the repetitious details need not be given here.

The following content may be deduced from Table 5 and Table 6.

| Third embodiment | | | |
|---|---|---|---|
| |f/f1| | 0.9053 | InRS61 | −1.0672 |
| f1/ΣPP | 0.1136 | InRS62 | −1.0404 |
| f7/ΣNP | 0.2160 | Inf62 | 0 |
| IN12/f | 0.1269 | HVT62 | 0 |
| HOS/f | 1.2758 | InRS71 | −1.0575 |
| ΣPPR | 2.7583 | InRS72 | −1.0798 |
| |ΣNPR| | 2.4415 | Inf72 | 0.0771 |
| ΣPPR/|ΣNPR| | 1.1297 | HVT72 | 1.5969 |
| (R13 − R14)/(R13 + R14) | −2.3346 | |InRS62|/TP6 | 2.9315 |
| HOS | 5.8335 | |InRS62| + |InRS71| | 2.0979 |
| HOS/HOI | 5.1914 | |InRS72|/TP7 | 3.0667 |
| InS/HOS | 0.9428 | Inf72/|InRS72| | 0.0714 |
| InTL/HOS | 0.8910 | HVT72/HOI | 0.4162 |
| ΣTP/InTL | 0.5635 | HVT72/HOS | 0.2737 |
| (TP1 + IN12)/TP2 | 5.1330 | HVT72/(Inf72 + CT7) | 3.7206 |
| (TP7 + IN67)/TP6 | 1.5559 | |TDT| | 0.6800 |
| (TP3 + TP4 + TP5)/ΣTP | 0.4751 | |ODT| | 1.9866 |

The Fourth Embodiment

Embodiment 4

Figure 4A:
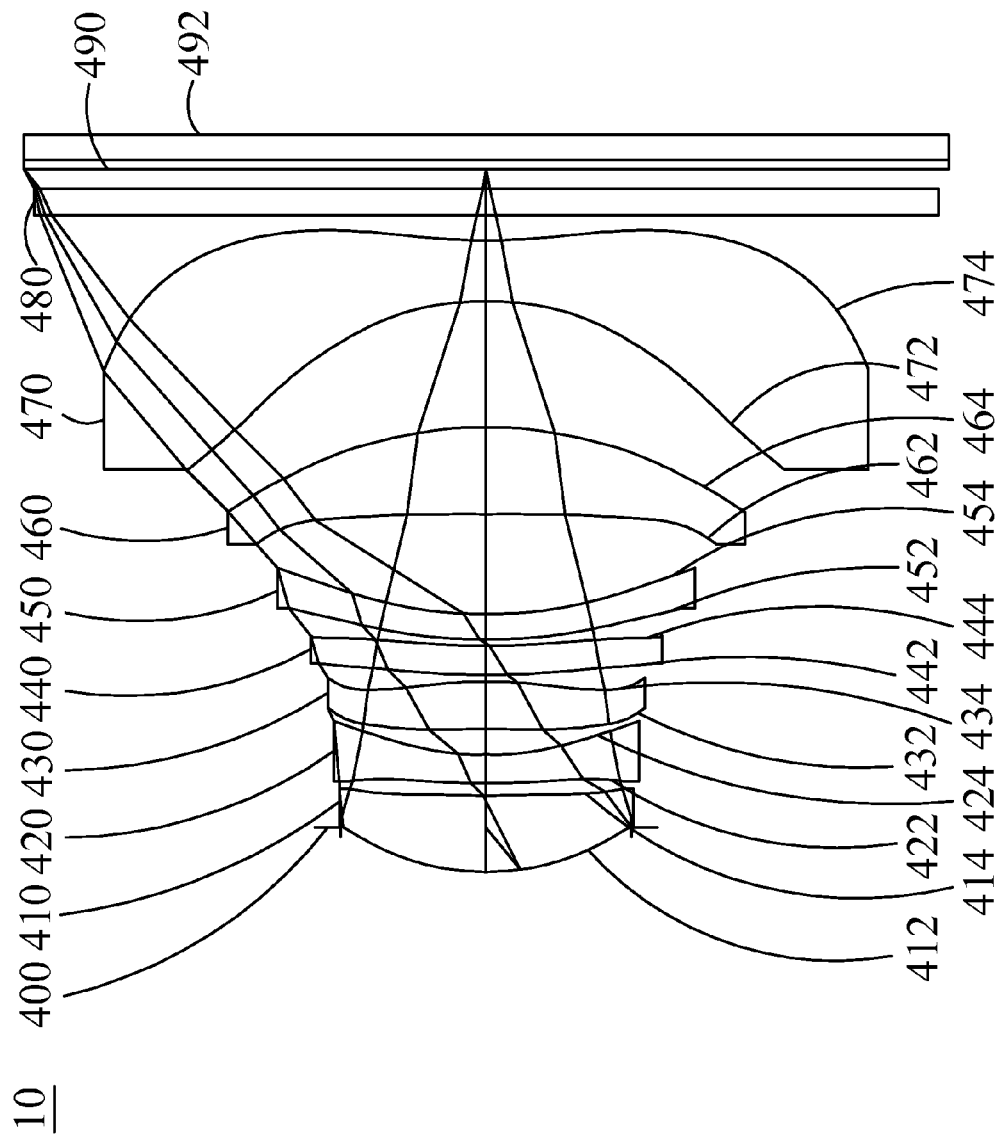
FIG. 4A is a schematic view of the optical image capturing system according to the fourth embodiment of the present application.
Figure 4B:
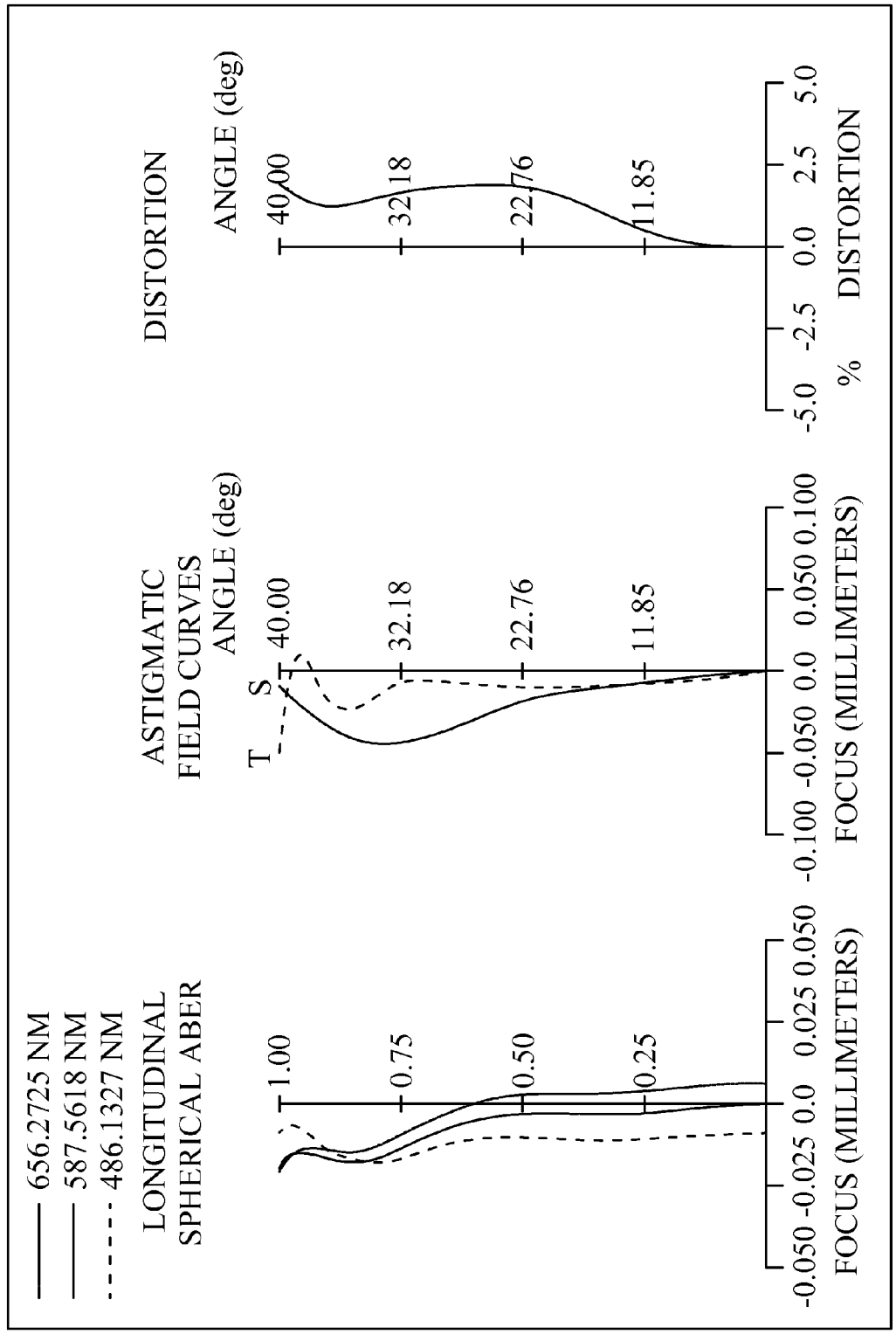
FIG. 4B is longitudinal spherical aberration curves, astigmatic field curves, and an optical distortion curve of the optical image capturing system in the order from left to right according to the fourth embodiment of the present application.
Figure 4C:
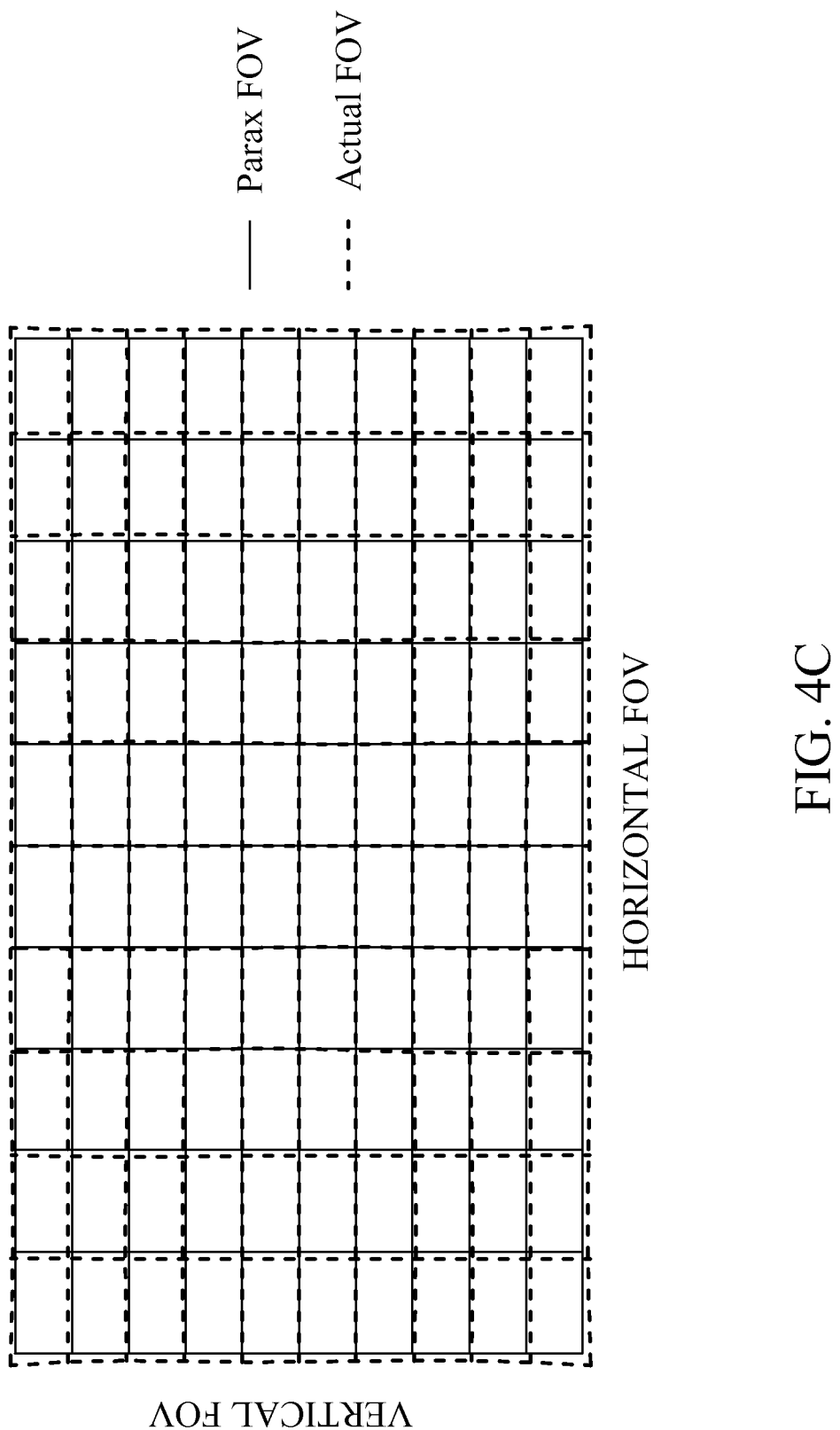
FIG. 4C is a TV distortion grid of the optical image capturing system according to the fourth embodiment of the present application.

Please refer to FIG. 4A, FIG. 4B, and FIG. 4C, FIG. 4A is a schematic view of the optical image capturing system according to the fourth embodiment of the present application, FIG. 4B is longitudinal spherical aberration curves, astigmatic field curves, and an optical distortion curve of the optical image capturing system in the order from left to right according to the fourth embodiment of the present application, and FIG. 4C is a TV distortion grid of the optical image capturing system according to the fourth embodiment of the present application. As shown in FIG. 4A, in order from an object side to an image side, the optical image capturing system includes an aperture stop 400, a first lens element 410, a second lens element 420, a third lens element 430, a fourth lens element 440, a fifth lens element 450, a sixth lens element 460, a seventh lens element 470, an IR-bandstop filter 480, an image plane 490, and an image sensing device 492.

The first lens element 410 has a positive refractive power and it is made of plastic material. The first lens element 410 has a convex object-side surface 412 and a concave image-side surface 414, and both of the object-side surface 412 and the image-side surface 414 are aspheric.

The second lens element 420 has a negative refractive power and it is made of plastic material. The second lens element 420 has a convex object-side surface 422 and a concave image-side surface 424, and both of the object-side surface 422 and the image-side surface 424 are aspheric.

The third lens element 430 has a positive refractive power and it is made of plastic material. The third lens element 430 has a concave object-side surface 432 and a convex image-side surface 434, and both of the object-side surface 432 and the image-side surface 434 are aspheric.

The fourth lens element 440 has a negative refractive power and it is made of plastic material. The fourth lens element 440 has a convex object-side surface 442 and a concave image-side surface 444, and both of the object-side surface 442 and the image-side surface 444 are aspheric.

The fifth lens element 450 has a negative refractive power and it is made of plastic material. The fifth lens element 450 has a convex object-side surface 452 and a concave image-side surface 454, and both of the object-side surface 452 and the image-side surface 454 are aspheric.

The sixth lens element 460 may have a positive refractive power and it is made of plastic material. The sixth lens element 460 has a concave object-side surface 462 and a convex image-side surface 464, and at least one of the object-side and the image-side surfaces of the sixth lens elements 460 may have at least one inflection point. Hereby, the spherical aberration can be improved by adjusting the angle of incidence from each view field to the sixth lens element 460 effectively.

The seventh lens element 470 has a negative refractive power and it is made of plastic material. The seventh lens element 470 has a concave object-side surface 472 and a concave image-side surface 474. Hereby, the back focal length is reduced for maintaining the miniaturization, so as to miniaturize the lens element effectively. Besides, the image-side surface 474 of the seventh lens elements has at least one inflection point, and the angle of incident with incoming light from an off-axis view field can be suppressed effectively and the aberration in the off-axis view field can be corrected further.

The IR-bandstop filter 480 is made of glass material without affecting the focal length of the optical image capturing system and it is disposed between the seventh lens element 470 and the image plane 490.

In the fourth embodiment of the optical image capturing system, focal lengths of the second lens element 420, the third lens element 430, the fourth lens element 440, the fifth lens element 450, and the sixth lens element 460 are f2, f3, f4, f5, and f6, respectively. The following relation is satisfied: |f2|+|f3|+|f4|+|f5|+|f6|=472.6722 mm, |f1|+|f7|=7.1716 mm, and |f2|+|f3|+|f4|+|f5|+|f6|>|f1|+|f7|.

In the fourth embodiment of the optical image capturing system, a central thickness of the sixth lens element 460 on the optical axis is TP6. A central thickness of the seventh lens element 470 on the optical axis is TP7. The following relation is satisfied: TP6=0.6737 mm and TP7=0.4780 mm.

In the fourth embodiment of the optical image capturing system, focal lengths of the first lens element 410, the third lens element 430, and the sixth lens element 460 are f1, f3, and f6, respectively. A sum of focal lengths of all lens elements with a positive refractive power is ΣPP. The following relation is satisfied: ΣPP=f1+f3+f6=17.4258 mm and f1/(f1+f3+f6)=0.2264. Hereby, it's favorable for allocating the positive refractive power of the first lens element 410 to others convex lens elements, and the significant aberrations generated in the process of moving the incident light can be suppressed.

In the fourth embodiment of the optical image capturing system, focal lengths of the second lens element 420, the fourth lens element 440, the fifth lens element 450, and the seventh lens element 470 are f2, f4, f5, and f7, respectively. A sum of focal lengths of all lens elements with a negative refractive power is ΣNP. The following relation is satisfied: ΣNP=f2+f4+f5+f7=−460.1883 mm and f7/(f2+f4+f5+f7)=0.0069. Hereby, it's favorable for allocating the negative refractive power of the seventh lens element to others concave lens elements.

Please refer to the following Table 7 and Table 8.

The detailed data of the optical image capturing system of the fourth embodiment is as shown in Table 7.

TABLE 7

Data of the optical image capturing system
f = 4.5913 mm; f/HEP = 2.0; HAF = 40 deg

| Surface # | | Curvature Radius | Thickness | Material | Index | Abbe # | Focal length |
|---|---|---|---|---|---|---|---|
| 0 | Object | Plano | Plano | | | | |
| 1 | Ape. stop | Plano | −0.33584 | | | | |
| 2 | Lens 1 | 2.03058 | 0.590857 | Plastic | 1.565 | 58 | 3.9446 |
| 3 | | 20.4411 | 0.095186 | | | | |
| 4 | Lens 2 | 7.2165 | 0.23 | Plastic | 1.607 | 26.6 | −5.5279 |
| 5 | | 2.2629 | 0.203986 | | | | |
| 6 | Lens 3 | −25.8857 | 0.366806 | Plastic | 1.565 | 58 | 7.4947 |
| 7 | | −3.6578 | 0.05 | | | | |
| 8 | Lens 4 | 4.82993 | 0.23 | Plastic | 1.583 | 30.2 | −417.085 |
| 9 | | 4.65281 | 0.05 | | | | |
| 10 | Lens 5 | 4.07572 | 0.2 | Plastic | 1.607 | 26.6 | −34.3868 |
| 11 | | 3.34669 | 0.787677 | | | | |

TABLE 7-continued

Data of the optical image capturing system
f = 4.5913 mm; f/HEP = 2.0; HAF = 40 deg

| Surface # | Curvature Radius | Thickness | Material | Index | Abbe # | Focal length |
|---|---|---|---|---|---|---|
| 12 | Lens 6 −26.3844 | 0.673693 | Plastic | 1.565 | 58 | 5.9865 |
| 13 | −3.02569 | 0.986435 | | | | |
| 14 | Lens 7 −2.52419 | 0.477982 | | 1.514 | 56.8 | −3.1886 |
| 15 | 4.97372 | 0.2 | | | | |
| 16 | IR-band stop filter Plano | 0.2 | | 1.517 | 64.2 | |
| 17 | Plano | 0.168846 | | | | |
| 18 | Image plane Plano | −0.01149 | | | | |

Reference wavelength (d-line) = 587.5 nm

As for the parameters of the aspheric surfaces of the fourth embodiment, reference is made to Table 8.

TABLE 8

Aspheric Coefficients

| Surface # | 2 | 3 | 4 | 5 | 6 | 7 |
|---|---|---|---|---|---|---|
| k = | −0.191857 | 25.98754 | −50 | −4.999511 | −50 | −9.392737 |
| A4 = | 6.14386E−03 | 2.32915E−02 | −2.49806E−02 | 4.00683E−03 | 3.95467E−02 | 2.10900E−02 |
| A6 = | −3.31769E−03 | −1.52625E−02 | −7.01466E−03 | −3.20652E−05 | 2.03340E−02 | 2.43080E−02 |
| A8 = | 8.88009E−03 | 1.70942E−02 | 4.64711E−03 | −3.92503E−03 | 7.65770E−03 | 9.32984E−03 |
| A10 = | −3.39721E−03 | −1.03920E−02 | −3.12460E−03 | 2.24376E−03 | −3.18162E−03 | 1.06022E−03 |
| A12 = | | | | | | |
| A14 = | | | | | | |

| Surface # | 8 | 9 | 10 | 11 | 12 | 13 |
|---|---|---|---|---|---|---|
| k = | −42.359197 | −47.139839 | −0.966022 | −0.488959 | 50 | −5.337175 |
| A4 = | −1.42368E−02 | −2.47822E−02 | −3.22998E−02 | −2.50181E−03 | −1.24457E−03 | −8.76726E−03 |
| A6 = | 1.78401E−04 | −4.09121E−03 | −1.22303E−03 | −4.37624E−04 | −3.09245E−03 | −1.02820E−03 |
| A8 = | 5.05797E−04 | 1.29767E−03 | −5.29555E−04 | −5.19599E−04 | −2.50603E−04 | 9.21696E−05 |
| A10 = | 7.36701E−04 | 1.83292E−03 | 8.63712E−05 | −7.53064E−05 | 2.58380E−05 | 3.49235E−05 |
| A12 = | | | 1.13272E−04 | 2.62827E−05 | −8.54214E−07 | 4.63569E−06 |
| A14 = | | | −5.84875E−05 | −7.62110E−06 | −5.71425E−06 | −1.72555E−06 |

| Surface # | 14 | 15 |
|---|---|---|
| k = | −0.340205 | −50 |
| A4 = | −2.93139E−02 | −1.46251E−02 |
| A6 = | 4.22896E−03 | 5.73622E−04 |
| A8 = | 2.59804E−04 | −1.46156E−04 |
| A10 = | 1.81189E−05 | 1.04247E−05 |
| A12 = | −4.73923E−06 | 8.16570E−07 |
| A14 = | −4.15107E−08 | −1.42180E−07 |

The presentation of the aspheric surface formula in the fourth embodiment is similar to that in the first embodiment. Besides the definitions of parameters in following tables are equal to those in the first embodiment so the repetitious details need not be given here.

The following content may be deduced from Table 7 and Table 8.

| Fourth embodiment | | | |
|---|---|---|---|
| \|f/f1\| | 1.1578 | InRS61 | −0.3219 |
| f1/ΣPP | 0.2264 | InRS62 | −0.7648 |
| f7/ΣNP | 0.0069 | Inf62 | 0 |
| IN12/f | 0.0207 | HVT62 | 0 |
| HOS/f | 1.1992 | InRS71 | −1.4335 |
| ΣPPR | 2.5301 | InRS72 | −1.348 |
| \|ΣNPR\| | 2.3969 | Inf72 | 0.0701 |
| ΣPPR/\|ΣNPR\| | 1.0556 | HVT72 | 1.3135 |
| (R13 − R14)/(R13 + R14) | −3.0610 | \|InRS62\|/TP6 | 1.1352 |
| HOS | 5.5061 | \|InRS62\| + \|InRS71\| | 2.1983 |
| HOS/HOI | 5.1355 | \|InRS72\|/TP7 | 2.8201 |
| InS/HOS | 0.9390 | Inf72/\|InRS72\| | 0.0520 |
| InTL/HOS | 0.8977 | HVT72/HOI | 0.3409 |
| ΣTP/InTL | 0.5603 | HVT72/HOS | 0.2386 |
| (TP1 + IN12)/TP2 | 2.9830 | HVT72/(Inf72 + CT7) | 2.3965 |
| (TP7 + IN67)/TP6 | 2.1737 | \|TDT\| | 0.7730 |
| (TP3 + TP4 + TP5)/ΣTP | 0.2877 | \|ODT\| | 2.1116 |

The Fifth Embodiment

Embodiment 5

Figure 5A:
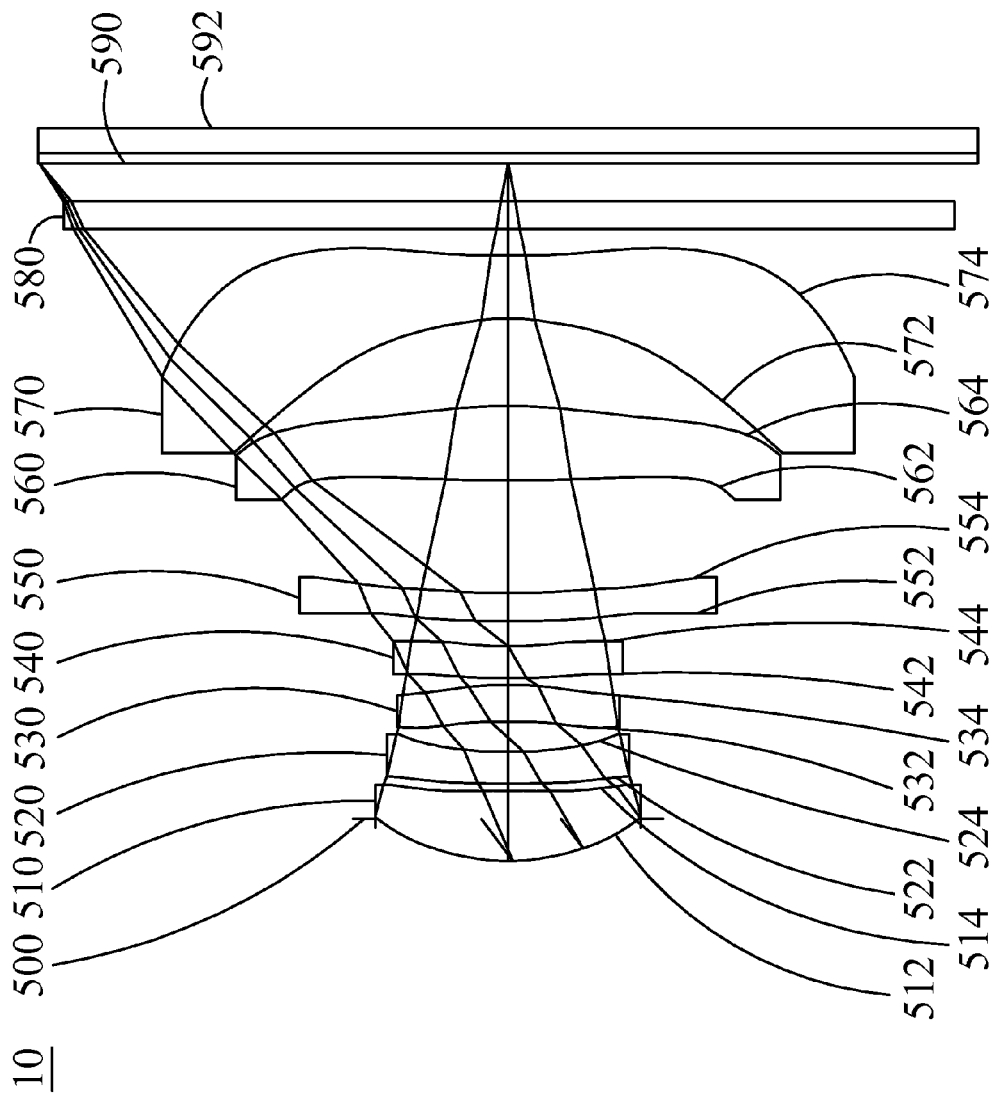
FIG. 5A is a schematic view of the optical image capturing system according to the fifth embodiment of the present application.
Figure 5B:
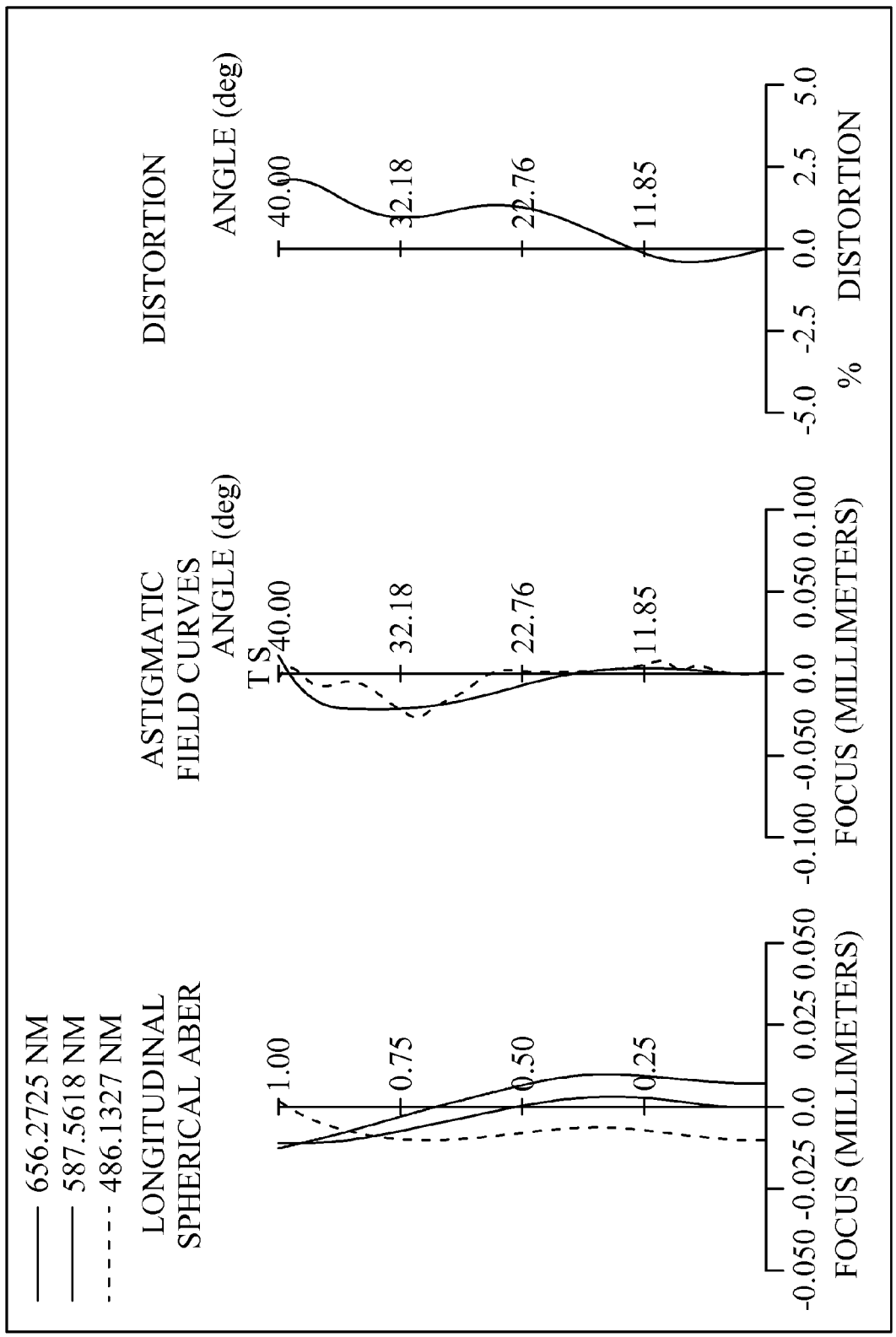
FIG. 5B is longitudinal spherical aberration curves, astigmatic field curves, and an optical distortion curve of the optical image capturing system in the order from left to right according to the fifth embodiment of the present application.
Figure 5C:
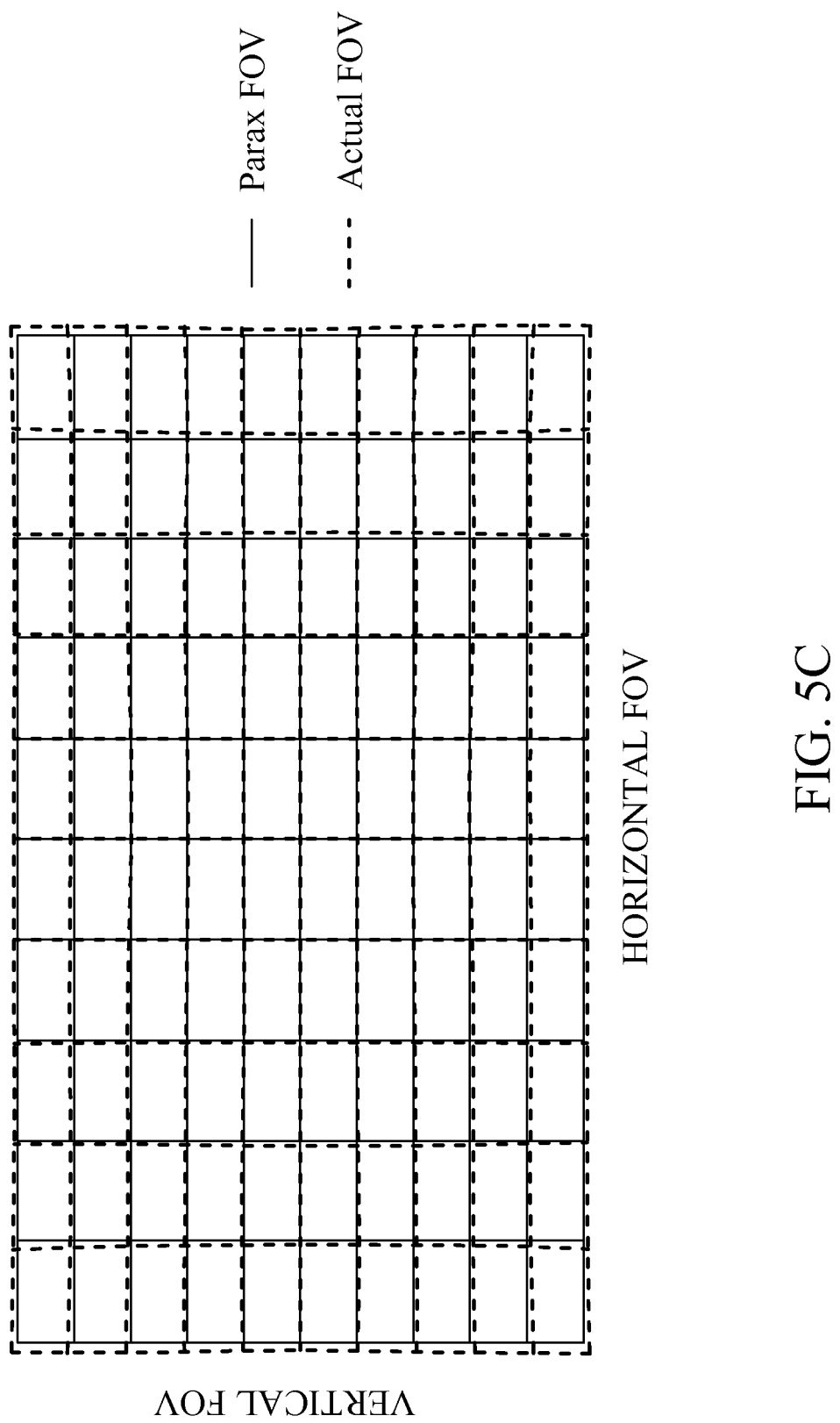
FIG. 5C is a TV distortion grid of the optical image capturing system according to the fifth embodiment of the present application.

Please refer to FIG. 5A, FIG. 5B, and FIG. 5C, FIG. 5A is a schematic view of the optical image capturing system according to the fifth embodiment of the present application, FIG. 5B is longitudinal spherical aberration curves, astigmatic field curves, and an optical distortion curve of the optical image capturing system in the order from left to right according to the fifth embodiment of the present application, and FIG. 5C is a TV distortion grid of the optical image capturing system according to the fifth embodiment of the present application. As shown in FIG. 5A, in order from an object side to an image side, the optical image capturing system includes an aperture stop 500, a first lens element 510, a second lens element 520, a third lens element 530, a fourth lens element 540, a fifth lens element 550, a sixth lens element 560, a seventh lens element 570, an IR-bandstop filter 580, an image plane 590, and an image sensing device 592.

The first lens element 510 has a positive refractive power and it is made of plastic material. The firth lens element 510 has a convex object-side surface 512 and a concave image-side surface 514, and both of the object-side surface 512 and the image-side surface 514 are aspheric.

The second lens element 520 has a negative refractive power and it is made of plastic material. The second lens element 520 has a convex object-side surface 522 and a concave image-side surface 524, and both of the object-side surface 522 and the image-side surface 524 are aspheric.

The third lens element 530 has a positive refractive power and it is made of plastic material. The third lens element 530 has a concave object-side surface 532 and a convex image-side surface 534, and both of the object-side surface 532 and the image-side surface 534 are aspheric.

The fourth lens element 540 has a negative refractive power and it is made of plastic material. The fourth lens element 540 has a convex object-side surface 542 and a concave image-side surface 544, and both of the object-side surface 542 and the image-side surface 544 are aspheric.

The fifth lens element 550 has a positive refractive power and it is made of plastic material. The fifth lens element 550 has a convex object-side surface 552 and a concave image-side surface 554, and both of the object-side surface 552 and the image-side surface 554 are aspheric.

The sixth lens element 560 may have a positive refractive power and it is made of plastic material. The sixth lens element 560 has a concave object-side surface 562 and a concave image-side surface 564, and the object-side surface 562 of the sixth lens element 560 has at least one inflection point. Hereby, the spherical aberration can be improved by adjusting the angle of incidence from each view field to the sixth lens element 560 effectively.

The seventh lens element 570 has a negative refractive power and it is made of plastic material. The seventh lens element 570 has a convex object-side surface 572 and a concave image-side surface 574. Hereby, the back focal length is reduced for maintaining the miniaturization, so as to miniaturize the lens element effectively. Besides, the image-side surface 574 of the seventh lens elements has at least one inflection point, and the angle of incident with incoming light from an off-axis view field can be suppressed effectively and the aberration in the off-axis view field can be corrected further.

The IR-bandstop filter 580 is made of glass material without affecting the focal length of the optical image capturing system and it is disposed between the seventh lens element 570 and the image plane 590.

In the fifth embodiment of the optical image capturing system, focal lengths of the second lens element 520, the third lens element 530, the fourth lens element 540, the fifth lens element 550, and the sixth lens element 560 are f2, f3, f4, f5, and f6, respectively. The following relation is satisfied: $|f2|+|f3|+|f4|+|f5|+|f6|=116.2046$ mm, $|f1|+|f7|=6.0808$ mm, and $|f2|+|f3|+|f4|+|f5|+|f6|>|f1|+|f7|$.

In the fifth embodiment of the optical image capturing system, a central thickness of the sixth lens element 560 on the optical axis is TP6. A central thickness of the seventh lens element 570 on the optical axis is TP7. The following relation is satisfied: $TP6=0.5304$ mm and $TP7=0.4476$ mm.

In the fifth embodiment of the optical image capturing system, focal lengths of the first lens element 510, the third lens element 530, the fifth lens element 550, and the sixth lens element 560 are f1, f3, f5, and f6, respectively. A sum of focal lengths of all lens elements with a positive refractive power is $\Sigma PP$. The following relation is satisfied: $\Sigma PP=f1+f3+f5+f=81.4756$ mm and $f1/(f1+f3+f5+f6)=0.0413$. Hereby, it's favorable for allocating the positive refractive power of the first lens element 510 to others convex lens elements, and the significant aberrations generated in the process of moving the incident light can be suppressed.

In the fifth embodiment of the optical image capturing system, focal lengths of the second lens element 520, the fourth lens element 540, and the seventh lens element 570 are f2, f4, and f7, respectively. A sum of focal lengths of all lens elements with a negative refractive power is $\Sigma NP$. The following relation is satisfied: $\Sigma NP=f2+f4+f7=-41.2341$ mm and $f7/(f2+f4+f7)=0.0658$. Hereby, it's favorable for allocating the negative refractive power of the seventh lens element to others concave lens elements.

Please refer to the following Table 9 and Table 10.

The detailed data of the optical image capturing system of the fourth embodiment is as shown in Table 9.

TABLE 9

Data of the optical image capturing system
f = 4.5869 mm; f/HEP = 2.4; HAF = 36 deg

| Surface # | | Curvature Radius | Thickness | Material | Index | Abbe # | Focal length |
|---|---|---|---|---|---|---|---|
| 0 | Object | Plano | Plano | | | | |
| 1 | Ape. stop | Plano | −0.30194 | | | | |
| 2 | Lens 1 | 1.67885 | 0.502569 | Plastic | 1.565 | 58 | 3.3859 |
| 3 | | 12.71698 | 0.05 | | | | |
| 4 | Lens 2 | 5.38574 | 0.23 | Plastic | 1.65 | 21.4 | −7.1855 |
| 5 | | 2.44192 | 0.21546 | | | | |
| 6 | Lens 3 | −3.31318 | 0.267964 | Plastic | 1.514 | 56.8 | 16.1775 |
| 7 | | −2.43029 | 0.05 | | | | |
| 8 | Lens 4 | 4.17348 | 0.23 | Plastic | 1.607 | 26.6 | −31.321 |
| 9 | | 3.34488 | 0.18252 | | | | |
| 10 | Lens 5 | 7.24726 | 0.204591 | Plastic | 1.65 | 21.4 | 56.358 |
| 11 | | 8.96491 | 0.811146 | | | | |

TABLE 9-continued

Data of the optical image capturing system
f = 4.5869 mm; f/HEP = 2.4; HAF = 36 deg

| Surface # | | Curvature Radius | Thickness | Material | Index | Abbe # | Focal length |
|---|---|---|---|---|---|---|---|
| 12 | Lens 6 | 57.40191 | 0.530414 | Plastic | 1.514 | 56.8 | 6.4721 |
| 13 | | −3.5003 | 0.628252 | | | | |
| 14 | Lens 7 | −2.47689 | 0.447587 | Plastic | 1.514 | 56.8 | −2.7276 |
| 15 | | 3.38613 | 0.2 | | | | |
| 16 | IR-bandstop filter | Plano | 0.2 | | 1.517 | 64.2 | |
| 17 | | Plano | 0.2799 | | | | |
| 18 | Image plane | Plano | −0.00199 | | | | |

Reference wavelength (d-line) = 587.5 nm

As for the parameters of the aspheric surfaces of the fifth embodiment, reference is made to Table 10.

TABLE 10

Aspheric Coefficients

| Surface # | 2 | 3 | 4 | 5 | 6 | 7 |
|---|---|---|---|---|---|---|
| k = | −0.19498 | 25.965245 | −24.834588 | −4.835407 | −11.460294 | −14.363279 |
| A4 = | 8.68431E−03 | 2.06667E−02 | −5.42623E−03 | 1.02033E−02 | 9.75389E−02 | 3.11015E−02 |
| A6 = | 2.05199E−03 | −1.55116E−02 | −4.57020E−03 | 1.60935E−02 | −5.86134E−03 | 8.04270E−02 |
| A8 = | 5.46113E−03 | 1.50417E−02 | −1.68343E−02 | −2.02109E−02 | 1.02915E−01 | 1.02785E−02 |
| A10 = | −1.77602E−03 | −6.27543E−03 | 1.30266E−02 | 1.81509E−02 | −4.33460E−02 | 1.56694E−02 |
| A12 = | | | | | | |
| A14 = | | | | | | |

| Surface # | 8 | 9 | 10 | 11 | 12 | 13 |
|---|---|---|---|---|---|---|
| k = | −50 | −31.574844 | 9.635245 | 8.366551 | −50 | −22.578376 |
| A4 = | −6.55395E−02 | −7.29455E−02 | 8.86110E−04 | −9.10165E−04 | 3.54135E−02 | 3.89278E−02 |
| A6 = | −9.07258E−03 | −5.96674E−03 | −1.23165E−02 | 5.36757E−03 | −2.75135E−02 | −1.33720E−02 |
| A8 = | −6.61190E−03 | −2.29490E−02 | −6.94666E−03 | −2.66396E−03 | 5.09075E−03 | 3.37191E−04 |
| A10 = | 1.72045E−02 | 2.11657E−02 | 7.53306E−04 | −1.43452E−03 | −9.81173E−04 | 8.08761E−05 |
| A12 = | | | 3.22496E−03 | 8.75091E−04 | 5.64122E−05 | 5.48106E−06 |
| A14 = | | | −1.37062E−03 | −1.59640E−04 | −2.87791E−05 | −2.51294E−06 |

| Surface # | 14 | 15 |
|---|---|---|
| k = | −0.421387 | −50 |
| A4 = | −2.57528E−02 | −3.30133E−02 |
| A6 = | 4.52341E−03 | 4.61348E−03 |
| A8 = | 2.25092E−04 | −8.64463E−04 |
| A10 = | 8.52708E−06 | 3.11316E−05 |
| A12 = | −5.52365E−06 | 4.27694E−06 |
| A14 = | 1.10684E−07 | −6.34271E−07 |

The presentation of the aspheric surface formula in the fifth embodiment is similar to that in the first embodiment. Besides the definitions of parameters in following tables are equal to those in the first embodiment so the repetitious details need not be given here.

The following content may be deduced from Table 9 and Table 10.

Fifth embodiment

| | | | |
|---|---|---|---|
| |f/f1| | 1.3579 | InRS61 | −0.5843 |
| f1/ΣPP | 0.0413 | InRS62 | −0.8824 |
| f7/ΣNP | 0.0658 | Inf62 | 0 |
| IN12/f | 0.0109 | HVT62 | 0 |
| HOS/f | 1.0995 | InRS71 | −1.3491 |
| ΣPPR | 2.4350 | InRS72 | −1.6687 |
| |ΣNPR| | 2.4783 | Inf72 | 0.0609 |
| ΣPPR/|ΣNPR| | 0.9825 | HVT72 | 1.0598 |
| (R13 − R14)/(R13 + R14) | −6.4485 | |InRS62|/TP6 | 1.6637 |

-continued

Fifth embodiment

| | | | |
|---|---|---|---|
| HOS | 5.0284 | |InRS62| + |InRS71| | 2.2315 |
| HOS/HOI | 4.9713 | |InRS72|/TP7 | 3.7281 |
| InS/HOS | 0.9400 | Inf72/|InRS72| | 0.0365 |
| InTL/HOS | 0.8652 | HVT72/HOI | 0.2762 |
| ΣTP/InTL | 0.5547 | HVT72/HOS | 0.2108 |
| (TP1 + IN12)/TP2 | 2.4026 | HVT72/(Inf72 + CT7) | 2.0842 |
| (TP7 + IN67)/TP6 | 2.0285 | |TDT| | 1.1400 |
| (TP3 + TP4 + TP5)/ΣTP | 0.2911 | |ODT| | 1.4032 |

The Sixth Embodiment

Embodiment 6

Figure 6A:
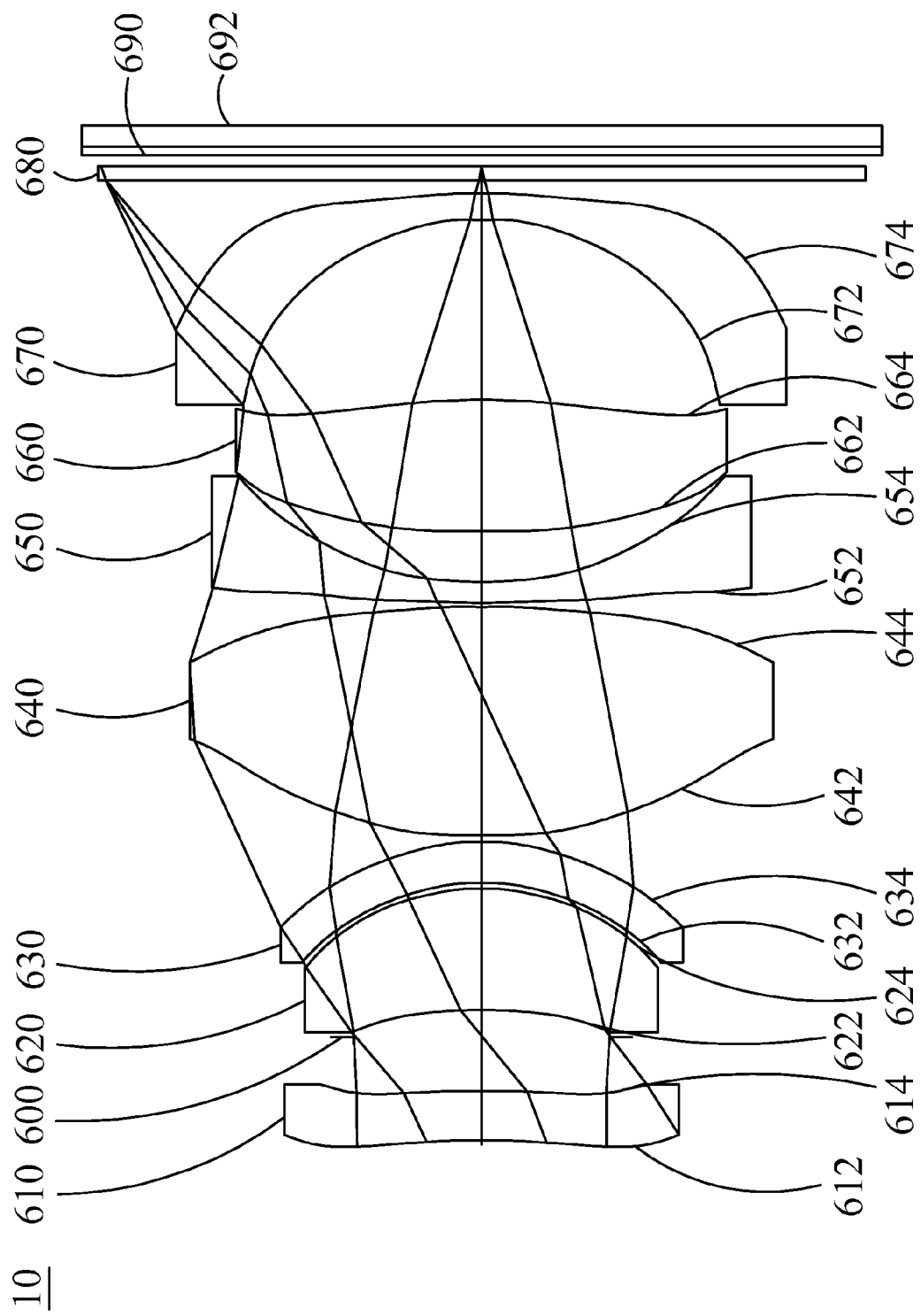
FIG. 6A is a schematic view of the optical image capturing system according to the sixth embodiment of the present application.
Figure 6B:
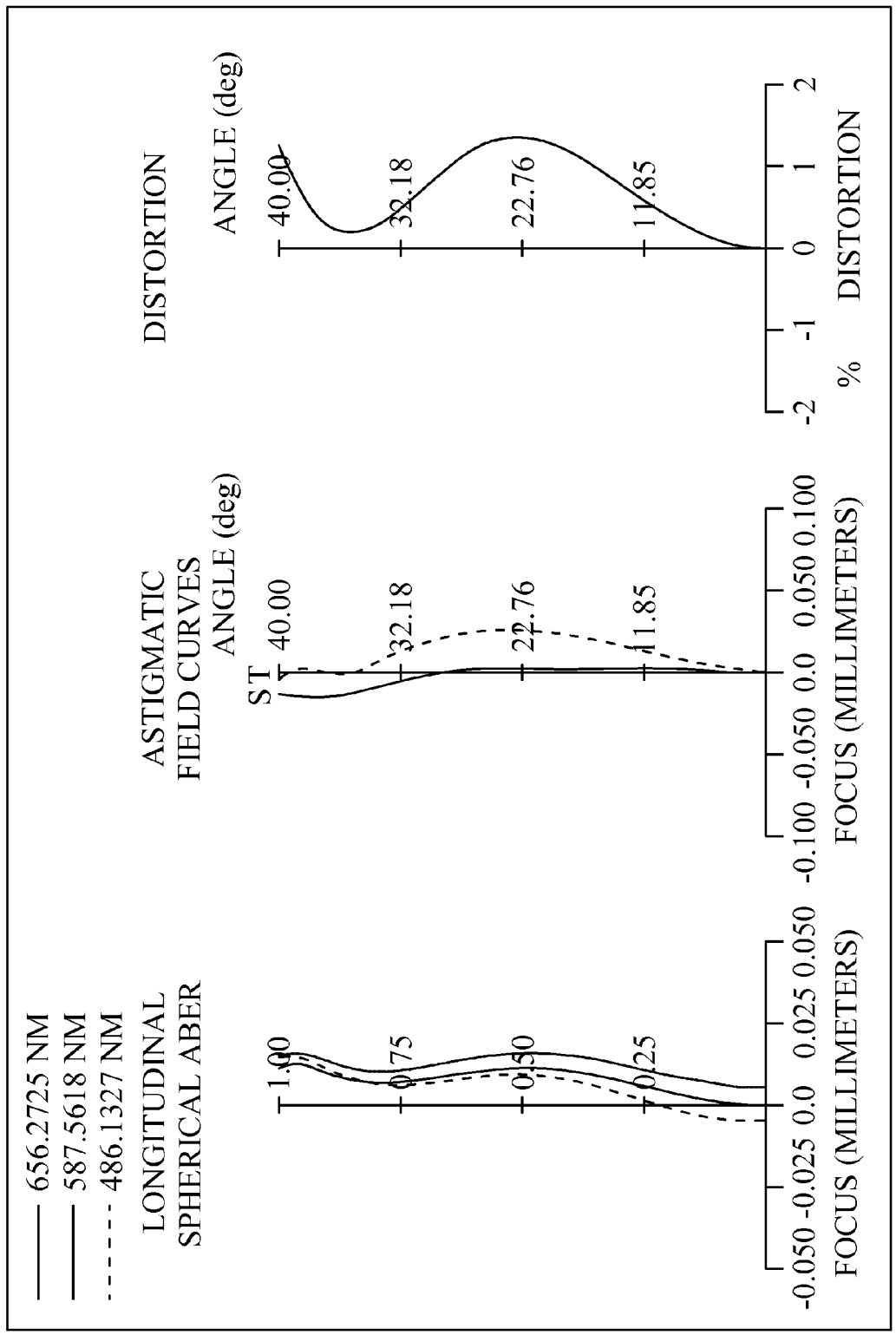
FIG. 6B is longitudinal spherical aberration curves, astigmatic field curves, and an optical distortion curve of the optical image capturing system in the order from left to right according to the sixth embodiment of the present application.
Figure 6C:
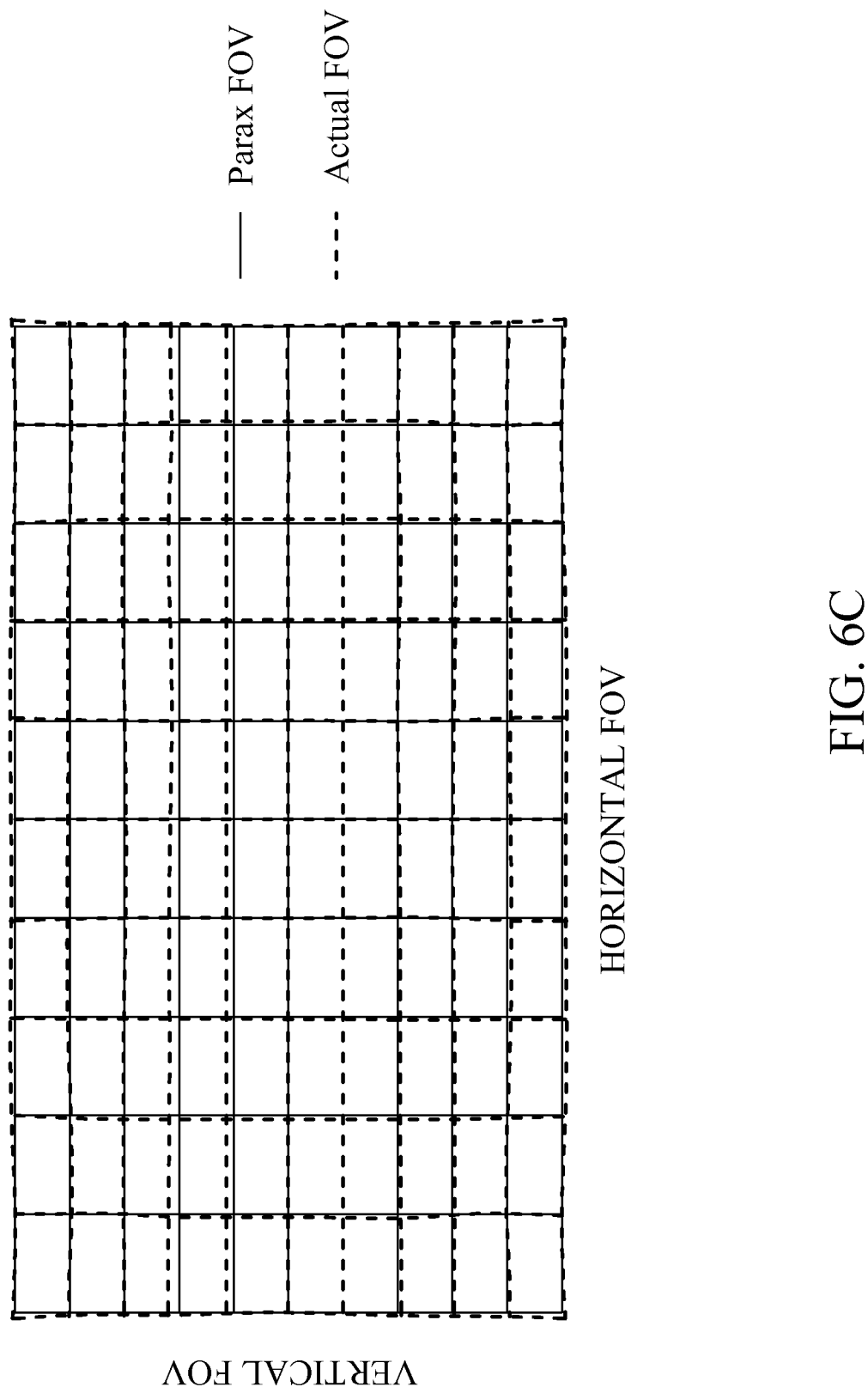
FIG. 6C is a TV distortion grid of the optical image capturing system according to the sixth embodiment of the present application.

Please refer to FIG. 6A, FIG. 6B, and FIG. 6C, FIG. 6A is a schematic view of the optical image capturing system according to the sixth embodiment of the present application, FIG. 6B is longitudinal spherical aberration curves, astigmatic field curves, and an optical distortion curve of the optical image capturing system in the order from left to right according to the sixth embodiment of the present application, and FIG. 6C is a TV distortion grid of the optical image capturing system according to the sixth embodiment of the present application. As shown in FIG. 6A, in order from an object side to an image side, the optical image capturing system includes an aperture stop 600, a first lens element 610, a second lens element 620, a third lens element 630, a fourth lens element 640, a fifth lens element 650, a sixth lens element 660, a seventh lens element 670, an IR-bandstop filter 680, an image plane 690, and an image sensing device 692.

The first lens element 610 has a negative refractive power and it is made of plastic material. The first lens element 610 has a concave object-side surface 612 and a convex image-side surface 614, and both of the object-side surface 612 and the image-side surface 614 are aspheric.

The second lens element 620 has a positive refractive power and it is made of plastic material. The second lens element 620 has a concave object-side surface 622 and a convex image-side surface 624, and both of the object-side surface 622 and the image-side surface 624 are aspheric.

The third lens element 630 has a negative refractive power and it is made of plastic material. The third lens element 630 has a concave object-side surface 632 and a convex image-side surface 634, and both of the object-side surface 632 and the image-side surface 634 are aspheric.

The fourth lens element 640 has a positive refractive power and it is made of plastic material. The fourth lens element 640 has a convex object-side surface 642 and a convex image-side surface 644, and both of the object-side surface 642 and the image-side surface 644 are aspheric.

The fifth lens element 650 has a negative refractive power and it is made of plastic material. The fifth lens element 650 has a convex object-side surface 652 and a concave image-side surface 654, and both of the object-side surface 652 and the image-side surface 654 are aspheric.

The sixth lens element 660 has a positive refractive power and it is made of plastic material. The sixth lens element 660 has a convex object-side surface 662 and a convex image-side surface 664, and the object-side surface 662 of the sixth lens element 660 has at least one inflection point. Hereby, the spherical aberration can be improved by adjusting the angle of incidence from each view field to the sixth lens element 660 effectively.

The seventh lens element 670 has a negative refractive power and it is made of plastic material. The seventh lens element 670 has a concave object-side surface 672 and a convex image-side surface 674. Hereby, the back focal length is reduced for maintaining the miniaturization, so as to miniaturize the lens element effectively. In addition, at least one of the object-side and the image-side surfaces of the seventh lens elements 670 may have at least one inflection point, and the angle of incident with incoming light from an off-axis view field can be suppressed effectively and the aberration in the off-axis view field can be corrected further.

The IR-bandstop filter 680 is made of glass material without affecting the focal length of the optical image capturing system and it is disposed between the seventh lens element 670 and the image plane 690.

In the sixth embodiment of the optical image capturing system, focal lengths of the second lens element 620, the third lens element 630, the fourth lens element 640, the fifth lens element 650, and the sixth lens element 660 are f2, f3, f4, f5, and f6, respectively. The following relation is satisfied: |f2|+|f3|+|f4|+|f5|+|f6|=86.3084 mm and |f1|+|f7|=246.7079 mm.

In the sixth embodiment of the optical image capturing system, a central thickness of the sixth lens element 660 on the optical axis is TP6. A central thickness of the seventh lens element 670 on the optical axis is TP7. The following relation is satisfied: TP6=1.3445 mm and TP7=0.2466 mm.

In the sixth embodiment of the optical image capturing system, focal lengths of the second lens element 620, the fourth lens element 640, and the sixth lens element 660 are f2, f4, and f6, respectively. A sum of focal lengths of all lens elements with a positive refractive power is ΣPP. The following relation is satisfied: ΣPP=f2+f4+f6=22.6888 mm and f2/(f2+f4+f6)=0.3982. Hereby, it's favorable for allocating the positive refractive power of the first lens element 610 to others convex lens elements, and the significant aberrations generated in the process of moving the incident light can be suppressed.

In the sixth embodiment of the optical image capturing system, focal lengths of the first lens element 610, the third lens element 630, the fifth lens element 650, and the seventh lens element 670 are f1, f3, f5, and f7, respectively. A sum of focal lengths of all lens elements with a negative refractive power is ΣNP. The following relation is satisfied: ΣNP=f1+f3+f5+f7=−310.3275 mm and f7/(f1+f3+f5+f7)=0.0181. Hereby, it's favorable for allocating the negative refractive power of the seventh lens element to others concave lens elements, and the significant aberrations generated in the process of moving the incident light can be suppressed.

Please refer to the following Table 11 and Table 12.

The detailed data of the optical image capturing system of the fourth embodiment is as shown in Table 11.

TABLE 11

Data of the optical image capturing system
f = 4.5959 mm; f/HEP = 1.8; HAF = 40 deg

| Surface # | | Curvature Radius | Thickness | Material | Index | Abbe # | Focal length |
|---|---|---|---|---|---|---|---|
| 0 | Object | Plano | Plano | | | | |
| 1 | Lens 1 | −7.63591 | 0.511837 | Plastic | 1.607 | 26.6 | −241.082 |
| 2 | | −8.26026 | 0.563369 | | | | |
| 3 | Ape. stop | Plano | 0.272998 | | | | |
| 4 | Lens 2 | −4.10286 | 1.24021 | Plastic | 1.565 | 58 | 9.0344 |
| 5 | | −2.52281 | 0.057642 | | | | |
| 6 | Lens 3 | −2.43813 | 0.416132 | Plastic | 1.65 | 21.4 | −57.2659 |
| 7 | | −2.78444 | 0.05 | | | | |
| 8 | Lens 4 | 4.24762 | 2.367965 | Plastic | 1.565 | 58 | 6.0701 |
| 9 | | −14.2246 | 0.05 | | | | |

TABLE 11-continued

Data of the optical image capturing system
f = 4.5959 mm; f/HEP = 1.8; HAF = 40 deg

| Surface # | | Curvature Radius | Thickness | Material | Index | Abbe # | Focal length |
|---|---|---|---|---|---|---|---|
| 10 | Lens 5 | 20.25813 | 0.2 | Plastic | 1.65 | 21.4 | −6.3537 |
| 11 | | 3.41724 | 0.527712 | | | | |
| 12 | Lens 6 | 9.26516 | 1.344486 | Plastic | 1.565 | 58 | 7.5843 |
| 13 | | −7.5548 | 1.851024 | | | | |
| 14 | Lens 7 | −2.69118 | 0.246626 | Plastic | 1.607 | 26.6 | −5.6257 |
| 15 | | −13.139 | 0.15 | | | | |
| 16 | IR-bandstop filter | Plano | 0.15 | | 1.517 | 64.2 | |
| 17 | | Plano | −0.01229 | | | | |
| 18 | Image plane | Plano | 0.012294 | | | | |

Reference wavelength (d-line) = 587.5 nm

As for the parameters of the aspheric surfaces of the sixth embodiment, reference is made to Table 12.

TABLE 12

Aspheric Coefficients

| Surface # | 1 | 2 | 4 | 5 | 6 | 7 |
|---|---|---|---|---|---|---|
| k = | −33.312145 | −50 | −0.332792 | 0.043896 | −0.093202 | 0.285506 |
| A4 = | 1.26272E−02 | 2.03915E−02 | 4.18954E−03 | 3.10064E−03 | 2.07007E−04 | 1.94950E−03 |
| A6 = | 1.29612E−03 | 1.44214E−03 | −4.86569E−03 | −1.05746E−03 | 1.64521E−03 | 1.34900E−03 |
| A8 = | −3.52645E−04 | −3.02866E−05 | 7.11820E−04 | 1.31428E−04 | −5.65034E−05 | −1.42647E−05 |
| A10 = | 3.52569E−05 | 1.35388E−05 | −3.28977E−04 | −1.63946E−04 | −1.51193E−04 | −1.86006E−05 |
| A12 = | | | | | | |
| A14 = | | | | | | |

| Surface # | 8 | 9 | 10 | 11 | 12 | 13 |
|---|---|---|---|---|---|---|
| k = | −0.380699 | 10.93499 | 19.290896 | −0.0723 | 3.233085 | −11.778797 |
| A4 = | −1.32802E−03 | −1.67996E−03 | 1.12998E−03 | −1.31585E−03 | 1.93655E−03 | 2.30335E−03 |
| A6 = | 1.29019E−04 | −1.31982E−04 | −1.90833E−04 | 1.67690E−04 | 3.82824E−04 | 6.90805E−04 |
| A8 = | 1.07233E−06 | −3.19390E−06 | −3.15177E−05 | 4.13457E−05 | 1.75911E−05 | 1.48710E−05 |
| A10 = | −2.06880E−06 | 7.41371E−07 | −2.34346E−06 | −1.30149E−06 | 1.94706E−06 | −5.99541E−06 |
| A12 = | | | 6.20400E−08 | −1.68471E−07 | 1.15194E−07 | −5.61580E−07 |
| A14 = | | | 6.93550E−08 | −1.77237E−08 | 1.45320E−08 | 1.94347E−07 |

| Surface # | 14 | 15 |
|---|---|---|
| k = | 0.194169 | −50 |
| A4 = | 2.04449E−03 | 1.59526E−03 |
| A6 = | 8.69537E−04 | −1.68389E−03 |
| A8 = | −2.69239E−04 | 4.04352E−05 |
| A10 = | 2.89014E−05 | 9.78632E−07 |
| A12 = | 1.71797E−06 | −7.92755E−08 |
| A14 = | −7.23500E−07 | −1.35502E−08 |

The presentation of the aspheric surface formula in the sixth embodiment is similar to that in the first embodiment. Besides the definitions of parameters in following tables are equal to those in the first embodiment so the repetitious details need not be given here.

The following content may be deduced from Table 11 and Table 12.

| Sixth embodiment | | | |
|---|---|---|---|
| |f/f1| | 0.0191 | InRS61 | 0.6122 |
| f1/ΣPP | 0.3982 | InRS62 | −0.0938 |
| f7/ΣNP | 0.0181 | Inf62 | 0 |
| IN12/f | 0.1820 | HVT62 | 0 |
| HOS/f | 2.1759 | InRS71 | −1.9038 |
| ΣPPR | 1.8718 | InRS72 | −1.4079 |
| |ΣNPR| | 1.6396 | Inf72 | 0 |
| ΣPPR/|ΣNPR| | 1.1416 | HVT72 | 0 |
| (R13 − R14)/(R13 + R14) | −0.6600 | |InRS62|/TP6 | 0.0698 |
| HOS | 10 | |InRS62| + |InRS71| | 1.9976 |
| HOS/HOI | 6.3717 | |InRS72|/TP7 | 5.7092 |
| InS/HOS | 0.8925 | Inf72/|InRS72| | 0 |
| InTL/HOS | 0.9700 | HVT72/HOI | 0 |
| ΣTP/InTL | 0.6523 | HVT72/HOS | 0 |
| (TP1 + IN12)/TP2 | 1.0871 | HVT72/(Inf72 + CT7) | 0 |
| (TP7 + IN67)/TP6 | 1.5601 | |TDT| | 1.0700 |
| (TP3 + TP4 + TP5)/ΣTP | 0.4716 | |ODT| | 1.3377 |

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An optical image capturing system, in order from an object side to an image side, comprising:
   a first lens element with a refractive power;
   a second lens element with a refractive power;
   a third lens element with a refractive power;
   a fourth lens element with a refractive power;
   a fifth lens element with a refractive power;
   a sixth lens element with a refractive power; and
   a seventh lens element with a refractive power;
   wherein at least one of the first through seventh lens elements has a positive refractive power, at least one of the image-side surface and the object-side surface of the first through seventh lens elements is aspheric, focal lengths of the first through seventh lens elements are f1, f2, f3, f4, f5, f6, and f7, respectively, a focal length of the optical image capturing system is f, an entrance pupil diameter of the optical image capturing system is HEP, and the following relation is satisfied: 0≤|f/f1|≤2 and 1.2≤f/HEP≤2.8.

2. The optical image capturing system of claim 1, wherein at least one of the first through sixth lens element has a positive refractive power and the seventh has a negative refractive power.

3. The optical image capturing system of claim 1, wherein on the optical axis, a total central thickness of all lens elements with refractive powers is ΣTP, a distance from the object-side surface of the first lens element to the image-side surface of the seventh lens element is InTL, and the following relation is satisfied: 0.1≤ΣTP/InTL≤0.9.

4. The optical image capturing system of claim 1, further comprises an image plane, a distance from the object-side surface of the first lens element to the image plane is HOS, and the following relation is satisfied: 0.5≤HOS/f≤2.5.

5. The optical image capturing system of claim 1, wherein a distance in parallel with an optical axis from a maximum effective diameter position to an axial point on the image-side surface of the seventh lens element is InRS72, a central thickness of the seventh lens element on the optical axis is TP7, and the following relation is satisfied: 0≤InRS72/TP7<10.

6. The optical image capturing system of claim 1, further comprises an aperture stop and an image plane, wherein on the optical axis, a distance from the aperture stop to the image plane is InS, a distance from the object-side surface of the first lens element to the image plane is HOS, and the following relation is satisfied: 0.5≤InS/HOS≤1.1.

7. The optical image capturing system of claim 1, wherein the following relation is satisfied: |f2|+|f3|+|f4|+|f5|+|f6|>|f1|+|f7| and |f1|>f7.

8. The optical image capturing system of claim 7, further comprises an image plane, wherein a distance from the object-side surface of the first lens element to the image-side surface of the seventh lens element is InTL, a distance from the object-side surface of the first lens element to the image plane is HOS, and the following relation is satisfied: 0.1≤InTL/HOS≤0.9.

9. The optical image capturing system of claim 8, wherein a distance perpendicular to the optical axis between the critical point of the object-side surface of the seventh lens element to the optical axis is HVT71, a distance perpendicular to the optical axis between the critical point of the image-side surface of the seventh lens element to the optical axis is HVT72, and the following relation is satisfied: 0≤HVT71/HVT72≤1.5 and 0≤HVT72/HOS≤0.5.

10. An optical image capturing system, in order from an object side to an image side, comprising:
    a first lens element with a refractive power;
    a second lens element with a refractive power;
    a third lens element with a refractive power;
    a fourth lens element with a refractive power;
    a fifth lens element with a refractive power;
    a sixth lens element with a refractive power; and
    a seventh lens element with a negative refractive power;
    wherein at least one of the first through sixth lens element has a positive refractive power, at least one of the image-side surface and the object-side surface of the first through sixth lens elements is aspheric, focal lengths of the first through seventh lens elements are f1, f2, f3, f4, f5, f6, and f7, respectively, a focal length of the optical image capturing system is f, an entrance pupil diameter of the optical image capturing system is HEP, TV distortion for image formation in the optical image capturing system is TDT, and the following relation is satisfied: 0≤|f/f1|≤2, 1.2≤f/HEP≤2.8, and |TDT|<1.5%.

11. The optical image capturing system of claim 10, wherein optical distortion for image formation in the optical image capturing system is ODT and the following relation is satisfied: |ODT|≤2.5%.

12. The optical image capturing system of claim 10, wherein the following relation is satisfied: |f2|+|f3|+|f4|+|f5|+|f6|>|f1|+|f7| and |f1|>f7.

13. The optical image capturing system of claim 10, wherein a distance in parallel with an optical axis from a maximum effective diameter position to an axial point on the image-side surface of the seventh lens element is InRS72, a central thickness of the seventh lens element on the optical axis is TP7, and the following relation is satisfied: 0≤InRS72/TP7<10.

14. The optical image capturing system of claim 10, wherein half of the view angle of the optical image capturing system is HAF and the following relation is satisfied: 0.4≤|tan(HAF)|≤1.5.

15. The optical image capturing system of claim 10, further comprises an aperture stop and an image plane, wherein on the optical axis, a distance from the aperture stop to the image plane is InS, a distance from the object-side surface of the first lens element to the image plane is HOS, and the following relation is satisfied: 0.5≤InS/HOS≤1.1.

16. The optical image capturing system of claim 15, further comprising an image sensing device disposed on the image plane, wherein half of a diagonal of an effective detection field of the image sensing device is HOI, a distance from the object-side surface of the first lens element to the image-side surface of the seventh lens element is InTL, a distance from the image-side surface of the seventh lens element to the image plane is BFL, and the following relation is satisfied: 0.5≤(InTL/HOI)+(BFL/HOI)≤7.

17. The optical image capturing system of claim 10, further comprises an image plane, a distance from the object-side surface of the first lens element to the image-side surface of the seventh lens element is InTL, a distance from the object-side surface of the first lens element to the image plane is HOS, a total central thickness of all lens elements with refractive powers is ΣTP, and the following relation is satisfied: 0.5≤InTL/HOS≤0.95 and 0.1≤ΣTP/InTL≤0.9.

18. The optical image capturing system of claim 17, wherein a distance from the object-side surface of the first lens element to the image plane is HOS, and the following relation is satisfied: 0.5≤HOS/f≤2.5.

19. The optical image capturing system of claim 18, wherein a distance perpendicular to the optical axis between the critical point of the object-side surface of the seventh lens element to the optical axis is HVT71, a distance perpendicular to the optical axis between the critical point of the image-side surface of the seventh lens element to the optical axis is HVT72, and the following relation is satisfied: $0 \leq \text{HVT71}/\text{HVT72} \leq 1.5$ and $0 \leq \text{HVT72}/\text{HOS} \leq 0.5$.

20. An optical image capturing system, in order from an object side to an image side, comprising:
    a first lens element with a positive refractive power;
    a second lens element with a refractive power;
    a third lens element with a refractive power;
    a fourth lens element with a refractive power;
    a fifth lens element with a refractive power;
    a sixth lens element with a refractive power; and
    a seventh lens element with a negative refractive power;
    wherein at least one of the second through sixth lens element has a positive refractive power, at least one of the image-side surface and the object-side surface of the second through sixth lens elements is aspheric, focal lengths of the first through seventh lens elements are f1, f2, f3, f4, f5, f6, and f7, respectively, a focal length of the optical image capturing system is f, an entrance pupil diameter of the optical image capturing system is HEP, optical distortion and TV distortion for image formation in the optical image capturing system are ODT and TDT, respectively, and the following relation is satisfied: $|f1| > f7$, $0 \leq |f/f1| \leq 2$, $|f2|+|f3|+|f4|+|f5|+|f6| > |f1|+|f7|$, $1.2 \leq f/\text{HEP} \leq 2.8$, $|\text{TDT}| < 1.5\%$, and $|\text{ODT}| \leq 2.5\%$.

21. The optical image capturing system of claim 20, wherein a ratio f/fp of the focal length f of the optical image capturing system to a focal length fp of each of lens elements with a positive refractive power is PPR, a ratio f/fn of the focal length f of the optical image capturing system to a focal length fn of each of lens elements with a negative refractive power is NPR, a sum of the PPR of all lens elements with a positive refractive power is ΣPPR, a sum of the NPR of all lens elements with a negative refractive power is ΣNPR, and the following relation is satisfied: $0.5 \leq \Sigma\text{PPR}/|\Sigma\text{NPR}| \leq 2$.

22. The optical image capturing system of claim 20, wherein a distance in parallel with an optical axis from a maximum effective diameter position to an axial point on the image-side surface of the seventh lens element is InRS72, a central thickness of the seventh lens element on the optical axis is TP7, a distance perpendicular to the optical axis between the critical point of the object-side surface of the seventh lens element to the optical axis is HVT71, a distance perpendicular to the optical axis between the critical point of the image-side surface of the seventh lens element to the optical axis is HVT72, and the following relation is satisfied: $0 \leq \text{InRS72}/\text{TP7} < 10$ and $0 \leq \text{HVT71}/\text{HVT72}$.

23. The optical image capturing system of claim 20, further comprising an aperture stop, an image plane, and an image sensing device disposed on the image plane, wherein on the optical axis, a distance from the aperture stop to the image plane is InS, a distance from the object-side surface of the first lens element to the image plane is HOS, and the following relation is satisfied: $0.5 \leq \text{InS}/\text{HOS} \leq 1.1$ and $0.5 \leq \text{HOS}/f \leq 2.5$.

* * * * *